(12) United States Patent
Grant et al.

(10) Patent No.: US 7,339,980 B2
(45) Date of Patent: Mar. 4, 2008

(54) SUCCESSIVE INTERFERENCE CANCELLATION IN A GENERALIZED RAKE RECEIVER ARCHITECTURE

(75) Inventors: Stephen James Grant, Cary, NC (US); Jung-Fu Cheng, Cary, NC (US); Leonid Krasny, Cary, NC (US); Karl James Molnar, Cary, NC (US); Yi-Pin Wang, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 769 days.

(21) Appl. No.: 10/795,101

(22) Filed: Mar. 5, 2004

(65) Prior Publication Data

US 2005/0195889 A1  Sep. 8, 2005

(51) Int. Cl.
*H04B 1/00* (2006.01)
(52) U.S. Cl. .................................................. 375/148
(58) Field of Classification Search ................ 375/147, 375/148, 149, 150, 343, 346; 704/216, 218, 704/237, 263; 708/5, 422, 813; 342/108, 342/145, 189, 378
See application file for complete search history.

(56) References Cited

U.S. PATENT DOCUMENTS

| 5,787,130 | A | 7/1998 | Kotzin et al. |
| 5,894,473 | A | 4/1999 | Dent |
| 6,363,104 | B1 | 3/2002 | Bottomley |
| 6,714,585 | B1 | 3/2004 | Wang et al. |
| 6,801,565 | B1 | 10/2004 | Bottomley et al. |
| 2003/0206577 | A1* | 11/2003 | Liberti et al. ............... 375/152 |
| 2004/0052306 | A1* | 3/2004 | Ibrahim et al. ............. 375/152 |

FOREIGN PATENT DOCUMENTS

WO  WO 01/71927 A2  9/2001

OTHER PUBLICATIONS

Hsu et al. A New Adaptive Linear Multi-Stage Multiuser Detector for DS-CDMA Systems, 2003 IEEE, p. 365-369.*
Generalized RAKE Receivers for MIMO Systems; Grant, et al., 2003 IEEE; 5 pgs.
A Generalized RAKE Receiver for Interference Suppression, Bottomley, et al. 2000 IEEE; 10 pgs.
Multistage Detection in Asynchronous Code-Division Multiple-Access Communications; Varanasi, et al.; IEEE Transactions on Communications vol. 38, No. 4 Apr. 1990; 11 pgs.
Approaching Eigenmode BLAST Channel Capacity Using V-BLAST with Rate and Power Feedback; Chung, et al. 2001 IEEE; 5 pgs.
A Spread-Spectrum Multiaccess System with Cochannel Interference Cancellation for Multipath Fading Channels; Yoon, et al.; 1993 IEEE; 9 pgs.

(Continued)

*Primary Examiner*—Sam K. Ahn
(74) *Attorney, Agent, or Firm*—Coats & Bennett, P.L.L.C.

(57) ABSTRACT

A receiver includes a receiver circuit that decodes multiple signals of interest contained in a composite received signal. The receiver comprises a plurality of successive signal detection stages to detect respective signals contained in the composite received signal. Each detection circuit comprises at least one Generalized RAKE combining circuit and generates a detected signal at an output. Each but the last stage further comprises a signal regeneration circuit that cancels the signal of interest detected by that stage from a stage input signal provided to the next stage such that successive detection of the signals of interest benefits from cumulative cancellation of the previously detected signals.

66 Claims, 11 Drawing Sheets

OTHER PUBLICATIONS

Zero Forcing and Minimum Mena-Square-Error Equalization for Multiuser Detection in Code-Division Multiple-Access Channels; Klein et al; 1996 IEEE; 12 pgs.

Combined Decision-Feedback Multiuser Detection/Soft-Decision Decoding for CDMA Channels; Hafeez et al.; 1996 IEEE; 5 pgs.

A Co-Channel Interference Cancellation Technique Using Orthogonal Convolutional Codes; Sanada et al; 1996 IEEE; 8 pgs.

Suboptimum Multiuser Receivers for Convolutionally Coded Asynchronous DS-CDMA Systems; Giallorenzi, et al.; 1996 IEEE; 14 pgs.

Simplified Processing for High Spectral Efficiency Wireless Communication Employing Multi-Element Arrays; Foschini et al.; 1999 IEEE; 12 pgs.

Space-Time Receiver for Wideband BLAST in Rich-Scattering Wireless Channels; Lozano et al.; 5 pgs.

Detection Techniques for V-BLAST in Frequency Selective Fading Channels; Daniel Ka Chun So et al.; 5 pgs.

Optimum Decision Feedback Multiuser Equalization with Successive Decoding Achieves the Total Capacity of the Gaussian Multiple-Access Channel; Varanasi, et al.; Jul. 1997; 6 pgs.

Group Detection for Synchronous Gaussian Code-Division Multiple-Access Channels; IEEE Transactions on Information Theory; vol. 41, No. 4; Jul. 1995; 14 pgs.

* cited by examiner

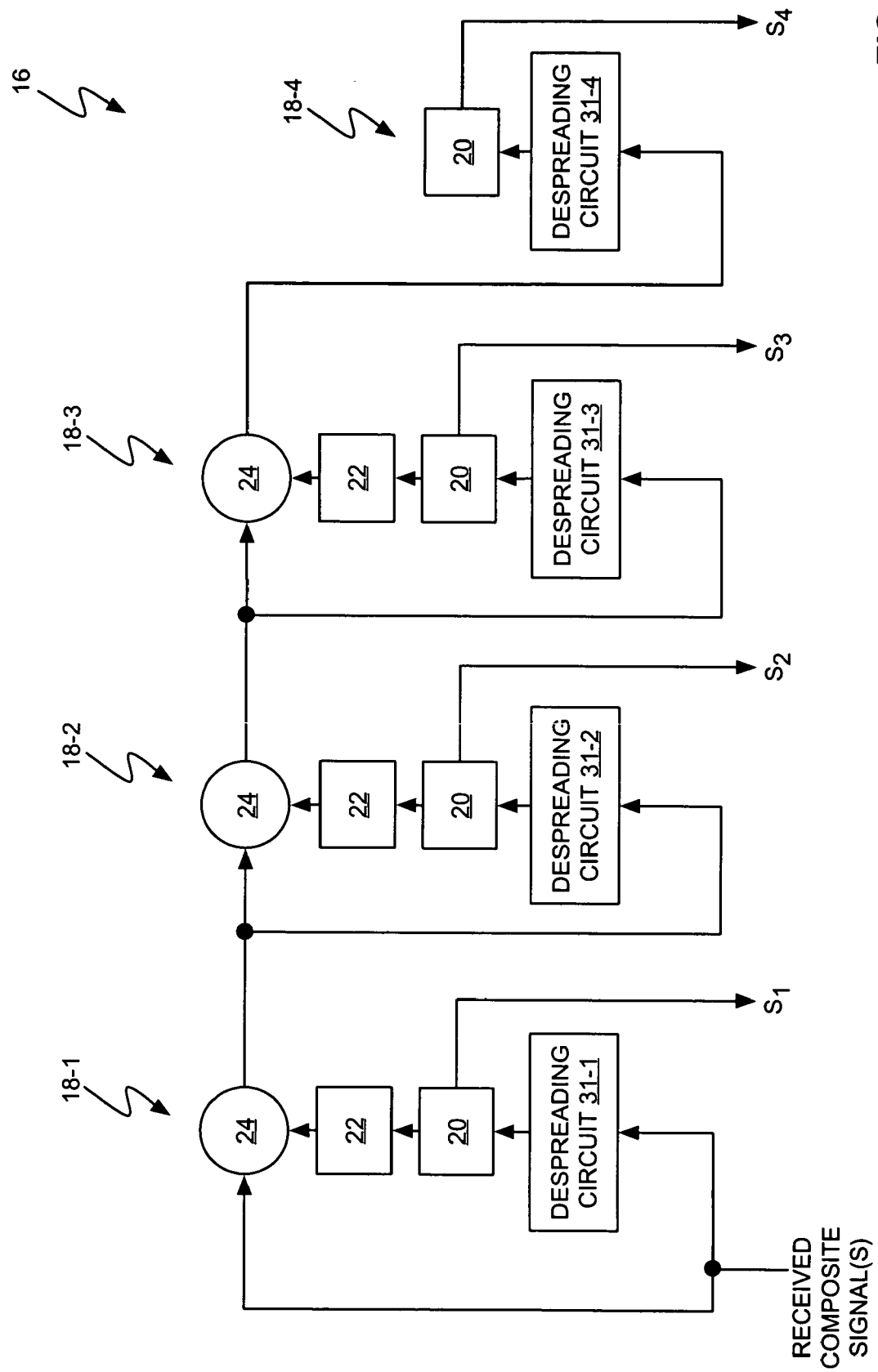

SUCCESSIVE INTERFERENCE CANCELLATION IN A GENERALIZED RAKE RECEIVER ARCHITECTURE

BACKGROUND OF THE INVENTION

Emerging third-generation (3G) wireless communication systems support several different kinds of services including voice, high-speed packet data and multimedia services. Further, 3G systems allow users to access several different services simultaneously. To meet the demand for these services, future wireless communication systems will need to provide much higher capacity than second-generation (2G) systems. Greater capacity can be obtained by allocating additional bandwidth, which is unlikely to occur, or by utilizing the allocated bandwidth more efficiently.

WCDMA (Wideband Code Division Multiple Access) is one technology that is expected to help fulfill the demand for 3G services. WCDMA is a multiple access technology for wireless communications over wideband frequency channels. Like narrowband Code Division Multiple Access (CDMA), WCDMA employs spreading codes to spread narrowband signals over the full width of the frequency channel. Each user transmits over a separate code channel and may transmit simultaneously with other users. Signals from multiple users combine during transmission over the communication channel so that the receiver sees the sum of all users' signals that overlap in time and frequency.

Current implementations of WCDMA use a single-user receiver called a RAKE receiver that separately detects signals from each user without considering other users. The RAKE receiver includes a plurality of RAKE fingers matched to a single user's spreading code, but aligned with different time delays to detect different multipaths of the user's signal. The RAKE fingers include a correlator that uses the particular spreading code assigned to the user to despread that user's signal. Signals from all other users are treated as noise. A RAKE combining circuit combines the despread signals output from each RAKE finger to obtain a combined signal with an improved signal to noise ratio (SNR).

While conventional RAKE receivers improve the SNR of the received signal, they do not address interference caused by other users' signals, i.e., multiple access interference (MAI) and intersymbol interference (ISI). MAI and ISI limit the capacity of CDMA systems. MAI is due to cross-correlation between different spreading codes in multipath fading channels. ISI is due to distortion of the transmitted signal that occurs in multipath channels. As the number of users increases, MAI also increases. When the number of users becomes large, conventional single-user receivers may not be able to detect signals from weak users because of high interference levels.

Recently, single-antenna Generalized RAKE (GRAKE) receivers have been developed for better suppressing interference. Interference suppression is achieved by treating ISI and MAI as colored Gaussian noise. The noise correlation across fingers is then exploited by adapting the finger delays and combining weights. In this way, the orthogonality between user signals may be partially restored. GRAKE receivers are described in U.S. Pat. No. 6,363,104, and in U.S. patent application Ser. Nos. 09/344,898 and 09/344,899, which are all incorporated herein by reference.

Multiuser detection (MUD) presents an alternative to single user detection and has been shown to be an effective way to suppress MAI and improve system capacity. In MUD systems, the signals from interfering users are used in the detection of individual user signals. Examples of MUD systems include successive interference cancellation (SIC) and decision feedback (DF). The SIC approach is based on the idea that once a decision has been made about an interfering user's bit, then the interfering signal can be recreated at the receiver using knowledge of the channel and subtracted from the received signal. This process is repeated successively, for one or more other users' signals, and progressively reduces the interference as each of the signals associated with other users is detected. Typically, the strongest signals are detected first and canceled from the received signal, which mitigates the interference for weaker signals.

The DF approach is based on a similar idea, except the subtraction is done on a processed version of the received signal, namely the receiver decision statistics. Furthermore, the subtracted quantity is formed from the previously detected user bits, in a similar manner as decision feedback equalization. While MUD systems are effective in reducing MAI, the complexity of optimal MUD systems increases exponentially with the number of users. Thus, most practical MUD systems use sub-optimal detection systems.

Currently there is a very high level of interest in multiple-input-multiple-output (MIMO) antenna systems for enhancing data rates in third generation (3G) wireless communication systems, particularly for high-speed-downlink-packet-access (HSDPA) in WCDMA and other systems. MIMO has been shown to yield tremendous capacity increases. In typical operating environments, the MIMO channel is frequency-selective, causing inter-symbol interference (ISI) and multiple-access interference (MAI). In addition, self-interference or code reuse interference occurs, even in flat-fading channels, since the spreading codes used in HSDPA are often reused across antennas in order to avoid code limitation problems. In MIMO systems, the challenge is to design a MUD receiver that achieves good performance while maintaining reasonable computational complexity because the processing power of mobile terminals is quite limited and the number of signals to demodulate is large due to multicode and multi-antenna transmission.

Much of the research into MIMO systems has focused on the well-known Vertical-Bell-laboratories-Layered Space-Time (V-BLAST) system where the use of both SIC and DF approaches has been proposed. In V-BLAST systems, interference cancellation using either the SIC or DF approach is based on detected bits before decoding because the different information signals are jointly coded. Recently a promising alternative to V-BLAST has been proposed for use with HSDPA called Per-Antenna-Rate-Control (PARC). This approach is capable of achieving data rates much higher than V-BLAST. The PARC scheme is based on a combined transmit/receive architecture that performs independent coding of the antenna streams at different rates, followed by the application of successive interference cancellation (SIC) and decoding at the receiver. It requires feedback of the per-antenna rates, which are based on the signal-to-interference-plus-noise ratios (SINRs) at each stage of the SIC. With this scheme, it has been shown that the full open-loop capacity of the MIMO flat-fading channel may be achieved, thus offering the potential for very high data rates.

SUMMARY OF THE INVENTION

The present invention comprises a method and apparatus wherein a receiver circuit employs a Generalized RAKE (GRAKE) architecture to detect signals of interest within a received composite signal using a series of successive signal detection stages that are arranged and configured to successively cancel the signals of interest detected in each prior stage from the input signal provided to the next stage in the series. Signal detection in each stage benefits from the use of a GRAKE combiner that computes impairment correlations between the despread values of the input signal provided to each particular stage, such that the impairment correlations computed in each stage depend on the particular input signal provided to that stage. As such, the impairment correlations computed for each successive stage change as a function of the successive cancellation of the signals of interest detected in the prior stages.

Thus, in one or more exemplary embodiments, the present invention comprises a method of processing a received composite communication signal that includes two or more signals of interest. The method comprises individually detecting the signals of interest in successive ones in a series of signal detection stages, canceling the signal of interest detected in each stage with respect to an input signal provided to the next stage in the series, and wherein, in each stage, detecting a signal of interest comprises generating combining weights as a function of impairment correlations between despread values of the input signal for that stage, and combining the despread values according to the combining weights. Complementing the above method, an exemplary receiver circuit comprises a plurality of successive signal detection stages, each stage comprising a RAKE combining circuit configured to detect a signal of interest received in the composite communication signal by combining despread values of a stage input signal that is derived from the received composite communication signal and each but the last stage further comprising a signal regeneration circuit configured to cancel the signal of interest detected by that stage from the stage input signal provided to the next signal detection stage. The exemplary RAKE combining circuit in each stage is configured to generate RAKE combining weights used in detecting the signal of interest based on one or more impairment correlations between the despread values of the stage input signal.

BRIEF DESCRIPTION OF THE DRAWINGS

FIG. 4 is a diagram illustrating one embodiment of the exemplary receiver circuit that includes a front-end despreader circuit, and wherein cascaded stage input signals comprise despread values subject to successive interference cancellation.

FIG. 5 is a diagram illustrating another embodiment of the exemplary receiver circuit that includes per-stage despreading circuit, and wherein cascaded stage input signals comprise received signal samples subject to successive interference cancellation.

DETAILED DESCRIPTION OF INVENTION

Discussing and illustrating details in the many exemplary embodiments of the present invention necessarily involves a certain level of complexity. Such complexities are explored in the exemplary details given later herein but an initial understanding of the present invention's broader aspects may be gained with reference to the relatively simple diagram given in FIG. 1. However, before discussing FIG. 1, it should be understood that the present invention broadly involves the application of GRAKE-based signal detection in combination with successive interference cancellation.

As used herein the term "GRAKE" connotes a RAKE combining circuit and/or combining method that calculates impairment correlations between the streams of despread values being RAKE combined by the circuit. Such impairments arise, for example, because of MAI, aggressive spreading code reuse, channel fading conditions, etc. Note that own-cell MAI may be accounted for as interference, while other-cell MAI may be treated as noise. Regardless, as will be explained later herein, however, GRAKE processing as used in the present invention is adapted for successive interference cancellation processing and, as noted, impairment correlation calculations in the successive stages of an exemplary signal detection chain reflect changing impairment conditions arising from successive signal cancellations.

Figure 1:
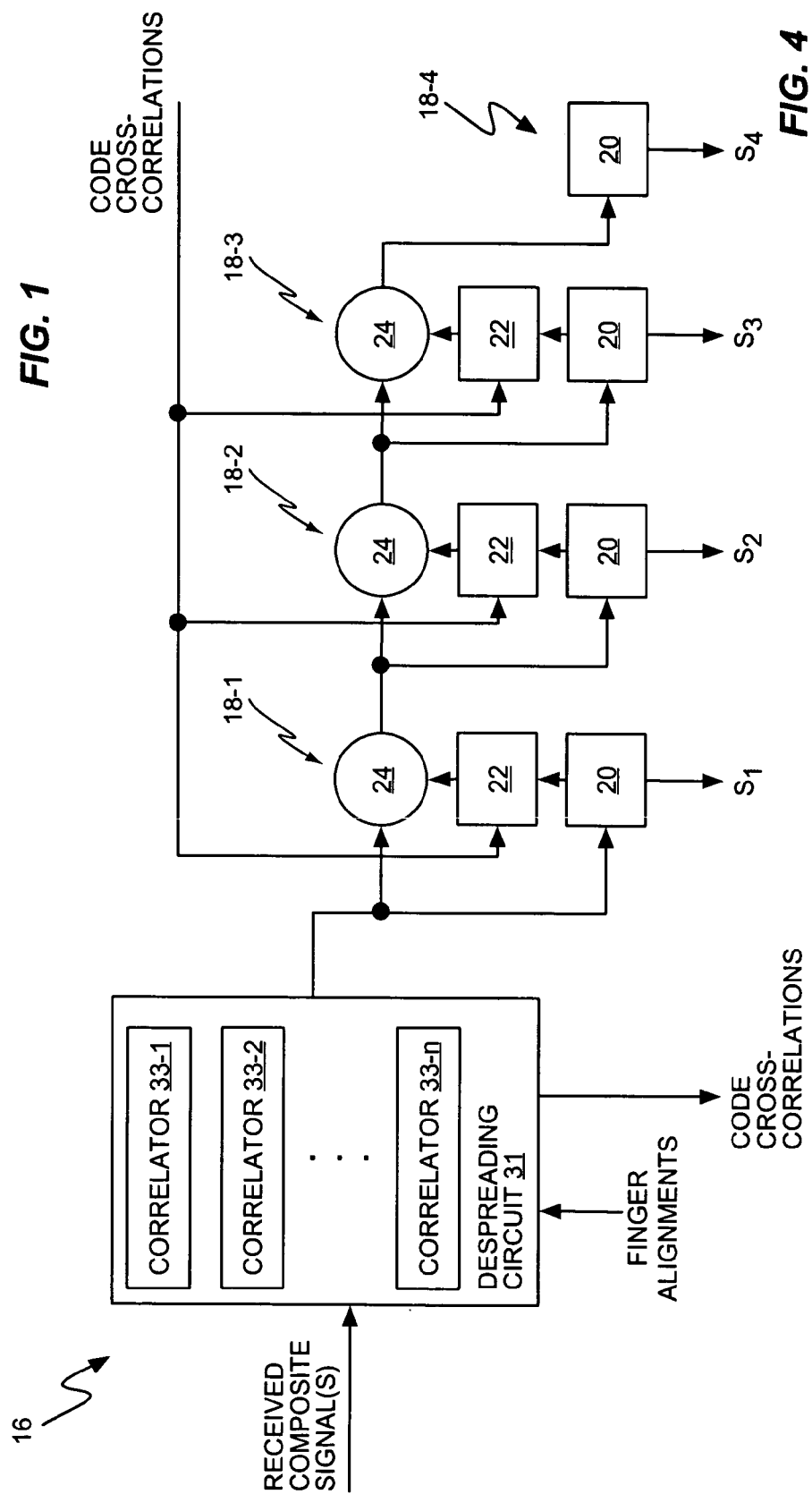
FIG. 1 is a diagram illustrating a wireless communication system.

Turning to FIG. 1, one sees an exemplary wireless communication system 8 comprising a transmitter 10 and a receiver 12 communicating over a channel 11, which typically is considered as including the effects of the transmit and receive signal processing paths (e.g., filter pulse shapes), as well as the effects of the transmission medium (e.g., the propagation paths between the transmitter and receiver). The transmitter 10 may, for example, be included in or associated with a radio base station, while the receiver 12 may be included in or associated with a mobile terminal, such as a cellular radiotelephone, a Portable Digital Assistant (PDA), laptop/palmtop computer, or other device having wireless communication capability.

The transmitter 10 and receiver 12 operate, for example, according to an agreed upon wireless signaling format/protocol, which may be but is not limited to IS-95B/IS-2000 (CDMA 2000) Code Division Multiple Access (CDMA), Wideband CDMA (WCDMA) or Universal Mobile Telecommunications Systems (UMTS) standards. Thus, while the invention is described at various points in the below discussion in the context of WCDMA systems, it will be readily apparent to those skilled in the art that the invention may be employed in other circumstances using other standards.

Further, it should be understood that an exemplary transmitter 10 might be configured according to a variety of desired transmitter configurations. For example, transmitter 10 may be configured according to a BLAST configuration (e.g., CR-BLAST), wherein it uses multiple transmitter antennas to transmit a user's desired signal as simultaneous parallel substreams. With this approach, the information signal for a given user is split into the parallel substreams, each of which may be separately coded. At receiver 12, the substreams are multipath received, typically using multiple receiver antennas and, according to the present invention, each of the received substreams can be detected successively as a signal of interest in a series of signal detection stages, and the influence of each substream can be successively cancelled moving down the chain of signal detection stages. In such configurations, the exemplary receiver 12 may associate each signal detection stage with a given one of the transmitter antennas. Of course, transmitter 10 may be configured for other transmission methods, such as PARC, which is explained in more detail herein. Selected aspects of the exemplary receiver 12 may be configured to exploit the particular characteristics of a given transmitter structure.

Figure 2:
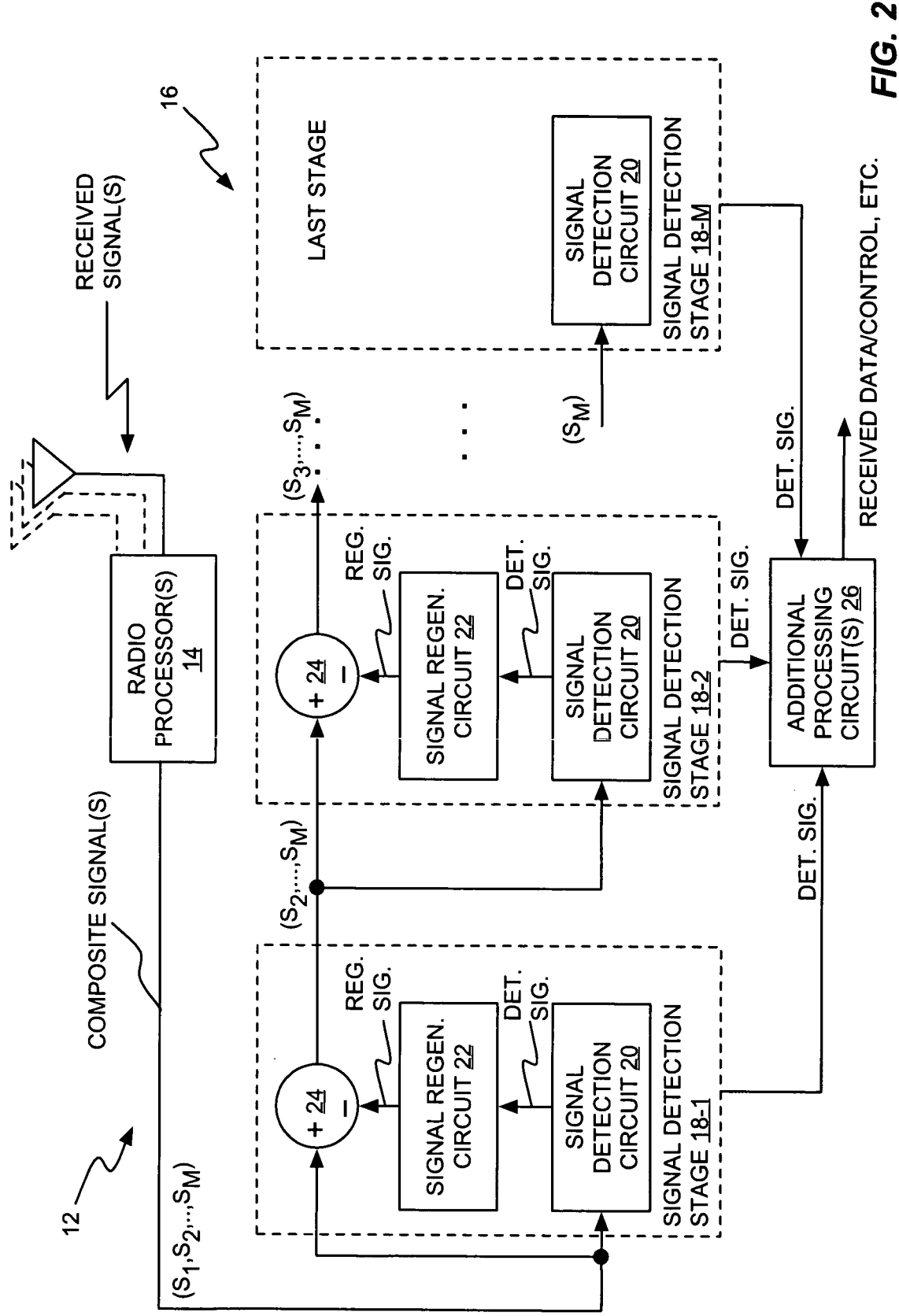
FIG. 2 is a diagram illustrating an exemplary wireless communication receiver that includes a receiver circuit configured according to one or more exemplary embodiments of the present invention.

Regardless, FIG. 2 illustrates exemplary details for receiver 12 wherein a radio front-end comprises a number of receiver antennas and one or more radio processors 14, and a receiver circuit 16 configured according to an exemplary embodiment of the present invention. Receiver circuit 16 comprises a plurality of successive signal detection stages 18-1 through 18-M, and in an exemplary configuration each stage comprises a signal detection circuit 20 and a signal regeneration circuit 22 that includes or is associated with a summing circuit 24.

In operation, the radio processor(s) 14 are configured to provide digitized samples corresponding to a received composite signal that includes multiple signals of interest. Such signals may represent the same information transmitted from two or more transmitter antennas, different substreams of a given user signal (e.g., BLAST, PARC), different streams in a multi-code signal, etc.

In any case, the successive signal detection stages 18 are configured to provide successive detection of the signals of interest within the received composite signal, e.g., signals $S_1, S_2, \ldots, S_M$, and further configured to provide successive cancellation of the detected signals such that later stages in the detection chain benefit from the detection and cancellation of signals in the prior stages. As seen, "interference" is removed successively from the cascaded stage input signals based on detecting a signal of interest in each stage 18, and canceling the detected signal of interest from the stage input signal provided to the next stage 18.

For example, in the illustrated configuration, stage 18-1 detects signal of interest $S_1$ from its stage input signal using its signal detection circuit 20. Signal $S_1$ is detected by stage 18-1 and removed from the cascaded input signal, which thus includes the remaining undetected signals of interest $S_2, S_3, \ldots, S_M$. That cascaded input signal is provided to stage 18-2, which detects signal $S_2$ and removes it from the cascaded input signal, which includes the remaining undetected signals of interest $S_3, \ldots, S_M$. Stage 18-3 detects and cancels signal $S_3$, and so on, until the cascaded input signal is processed by the last stage 18-M to obtain the last undetected signal of interest, signal SM. One sees that with such operation the stage input signal to stage 18-n benefits from the cancellations of all prior detection stages, such that the interference caused by the mutually received signals of interest is successively lessened as processing progresses through the series of stages 18.

With this configuration, an exemplary method of processing a received composite communication signal that includes two or more signals of interest may be implemented using the receiver circuit 16 based on individually detecting the signals of interest in successive ones in the series of signal detection stages 18, canceling the signal of interest detected in each stage with respect to an input signal provided to the next stage in the series. In each stage 18, detecting a signal of interest comprises generating (RAKE) combining weights as a function of impairment correlations between despread values of the input signal for that stage, and combining the despread values according to the combining weights.

Figure 3:
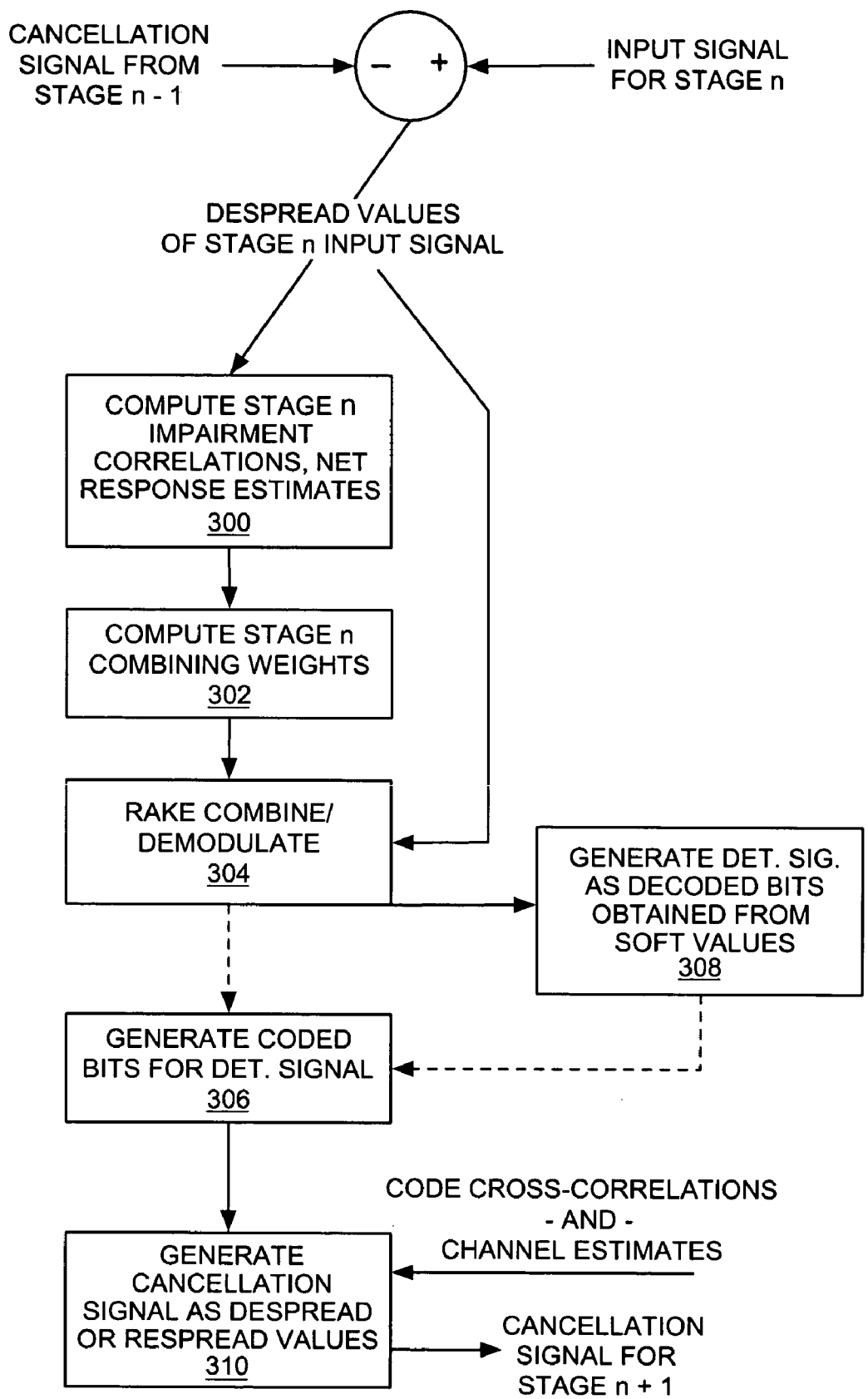
FIG. 3 is a diagram of exemplary processing logic carried out by a signal detection stage in an exemplary receiver circuit for successive signal detection and interference cancellation.

FIG. 3 illustrates exemplary processing logic for signal processing operations in the nth stage 18 of receiver circuit 16 according to one or more embodiments of the above method. Stage 18-n receives a stage input signal that is derived from the received composite signal. A cancellation signal from the prior stage 18-(n−1) removes interference caused by the signal detected by that prior stage and operations are carried out on despread values of that reduced-interference stage input signal.

The signal detection circuit 20 included in stage 18-n computes impairment correlations between the despread values of the stage input signal provided to stage 18-$n$. These impairment correlations are used along with net channel estimates to form combining weights that in turn are used to form a combined signal by RAKE combining the different streams of despread values of the stage input signal (Steps 300, 302, and 304). The different streams are generated by differently-aligned fingers of a RAKE despreader (i.e., by a number of correlators set to differing time alignments relative to the received composite signal).

The combined despread values, i.e., the RAKE combined signal, is demodulated to obtain soft values corresponding to estimates of the bits detected in the signal of interest. The signal of interest may comprise coded bits, in which case, the soft values may be decoded to obtain decoded bits. Stage 18-n generates bits from the soft values (Step 306), either by making hard decisions directly on the soft demodulation values to obtain hard-detected bits, or by re-encoding decoded bits obtained from the soft values. Each stage may include a decoder circuit to obtain the decoded bits (Step 308) from the soft values obtained from demodulation of the RAKE combined signal, or a centralized decoder may be used. Although re-encoding the decoded bits to obtain coded bits needed for signal regeneration and cancellation operations entails additional processing, the re-encoded bits benefit from any error corrections made during decoding the soft values. As such, using re-encoded bits to generate the cancellation signal for the next stage can result in a more robust cancellation signal than one derived from coded bits obtained by applying hard-decision logic directly to the soft values. In general, the signals of interest may included coded or uncoded bits, and thus the bits detected in each stage may correspond to coded or uncoded bits. Processing thus may or may not include decoding, and the present invention contemplates all such scenarios.

Regardless, the signal regeneration circuit of 18-n forms the cancellation signal for stage 18-(n+1) by re-generating the detected signal of interest based on the bits detected for the signal of interest. For example, hard-detected bits may be generated directly from the soft values, or those soft values can be decoded (if appropriate) and then re-encoded to obtain re-encoded bits. (Step 310). As will be explained in more detail later herein, the cascaded stage input signals may comprise despread values output by a front-end correlation circuit that is common to all stages 18. (Refer to FIG. 4 for an illustration of an exemplary front-end despreader 31 that includes a plurality of RAKE fingers 33.) In this case, signal regeneration circuit uses code cross-correlation information, i.e., code-to-code interference arising from less than perfect orthogonality, code reuse, etc., to regenerate despread values in a manner consistent with the common despreader. In another embodiment, the cascaded stage input signals are successively interference-cancelled samples of the received composite signal and dispreading is done locally in each stage 18. (Refer to FIG. 5 for an illustration of exemplary per-stage dispreading circuits 31.) In this instance, the signal regeneration circuit 22 generates the cancellation signal for stage 18-($n$+1) by mapping the coded bits to modulation symbols and respreading those symbols using the same spreading codes, and applying the channel estimates to the respread symbols.

Figure 6:
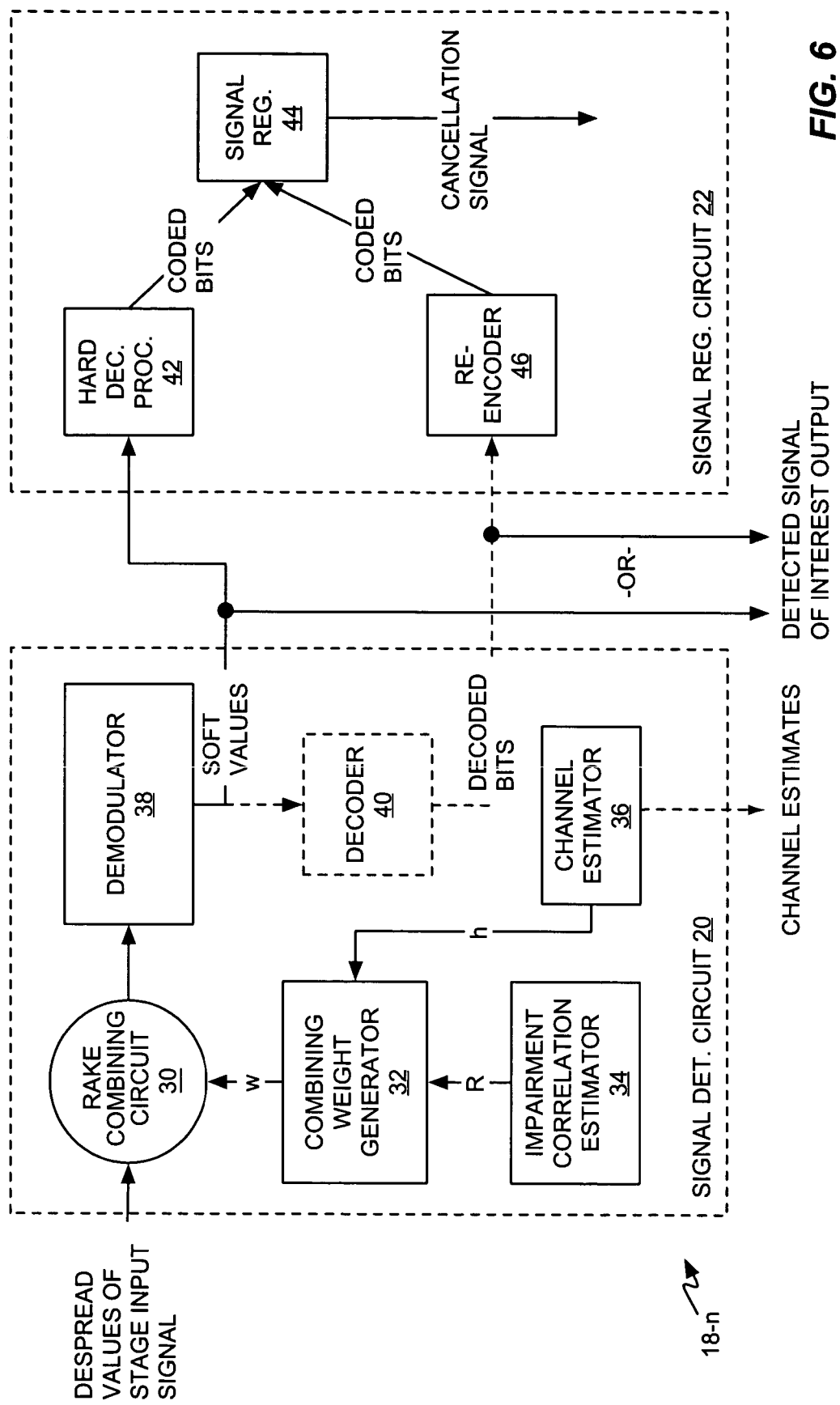
FIG. 6 is a diagram illustrating details for an exemplary signal detection stage.

FIG. 6 aids better understanding the apparatus and methods described above by illustrating exemplary details for a given one of the signal detection stages 18. (Note that the illustration generally holds for all stages 18 but it should be understood that the last stage in the series could be configured without the signal regeneration circuit 22.)

As shown, the exemplary signal detection circuit 20 comprises a combining circuit 30, a combining weight generator 32, an impairment correlation estimator 34, a channel estimator 36, a demodulator 38, and, optionally, a decoder 40. Additionally, the exemplary signal regeneration circuit 22 comprises a hard decision processor 42 and a signal regenerator 44. As an alternative to the hard decision processor 42, if the detection portion of the circuit includes the decoder 40, signal regeneration circuit 22 may include a re-encoder 46. Of course, it should be understood that the illustrated functional arrangement can be varied as needed. For example, the decoder 40 can be "located" in the regeneration circuit 22 and can output decoded bits corresponding to the detected signal for input to re-encoder 46 (and to higher-level processing circuits as needed or desired).

The combining circuit 30 receives the different streams of despread values that comprise the stage input signal (or are derived from it), and forms a RAKE combined signal by combining the despread values according to combining weight vectors generated by combining weight generator 32. Those combining weights are calculated at least in part from impairment correlations between the despread values of the stage input signal and from the net channel response(s) associated with the signal of interest, i.e., the end-to-end channel including transmitter/receiver filter pulse shape and propagation effects. While channel estimator 36, which may be implemented per-stage as shown here, or implemented elsewhere in the receiver circuit 16, provides the needed channel estimates, impairment correlation estimator 34 generates the needed impairment correlation estimates. As is described in more detail later herein, the impairment correlation estimator 34 in each stage generates impairment correlation estimates unique to that stage because of the successively reduced levels of interference in the series of stages 18.

With the combining weight vector w computed as a function of the impairment correlations and channel estimates, the combining circuit 30 applies those combining weights to the despread values of the stage input signal to obtain a RAKE combined signal that is compensated for impairment correlations, channel effects, etc., and which is input to demodulator 38. That combined signal comprises a sampled signal of one or more modulation symbols recovered for the signal of interest from the received composite signal. In turn, demodulator 38 generates a demodulated signal comprising soft values corresponding to the coded bits corresponding to the modulation symbols in the RAKE combined signal. Those soft values may be provided to a centralized decoder circuit for decoding to recover decoded information bits corresponding to the signal of interest, or may be decoded locally within the stage 18.

Independent of these variations, the signal regeneration circuit 22 obtains bits corresponding to the soft values (estimates of the bits detected for the signal of interest) either by processing them through hard decision processor 42, or by re-encoding decoded bits obtained from the soft values. In either instance, these bits are then used to regenerate the signal of interest in signal regenerator 44 for cancellation from the input signal provided to the next stage. Of course, using re-encoded bits to generate the cancellation signal may provide more robust cancellation because any error corrections made during soft-value decoding of the demodulated signal make the regenerated signal a more faithful reproduction of the signal of interest.

In general, the signal regeneration circuit 22 in each stage 18 (except for the last stage) generates a cancellation signal for the next stage based on the bits detected for the signal of interest being detected by that stage. Thus the soft values representing the detected bits can be decoded (if the signal of interest's bits are coded), and then re-encoded to obtain the bits used for generating the cancellation signal, or the soft values can be input to hard decision logic to obtain the bits used for cancellation signal generation. In either case, the cancellation signal can comprise despread values that are generated using corresponding channel estimates (net responses) and code cross-correlations. Alternatively, the cancellation signal can comprise re-spread values based on the corresponding channel estimates.

Figure 7:
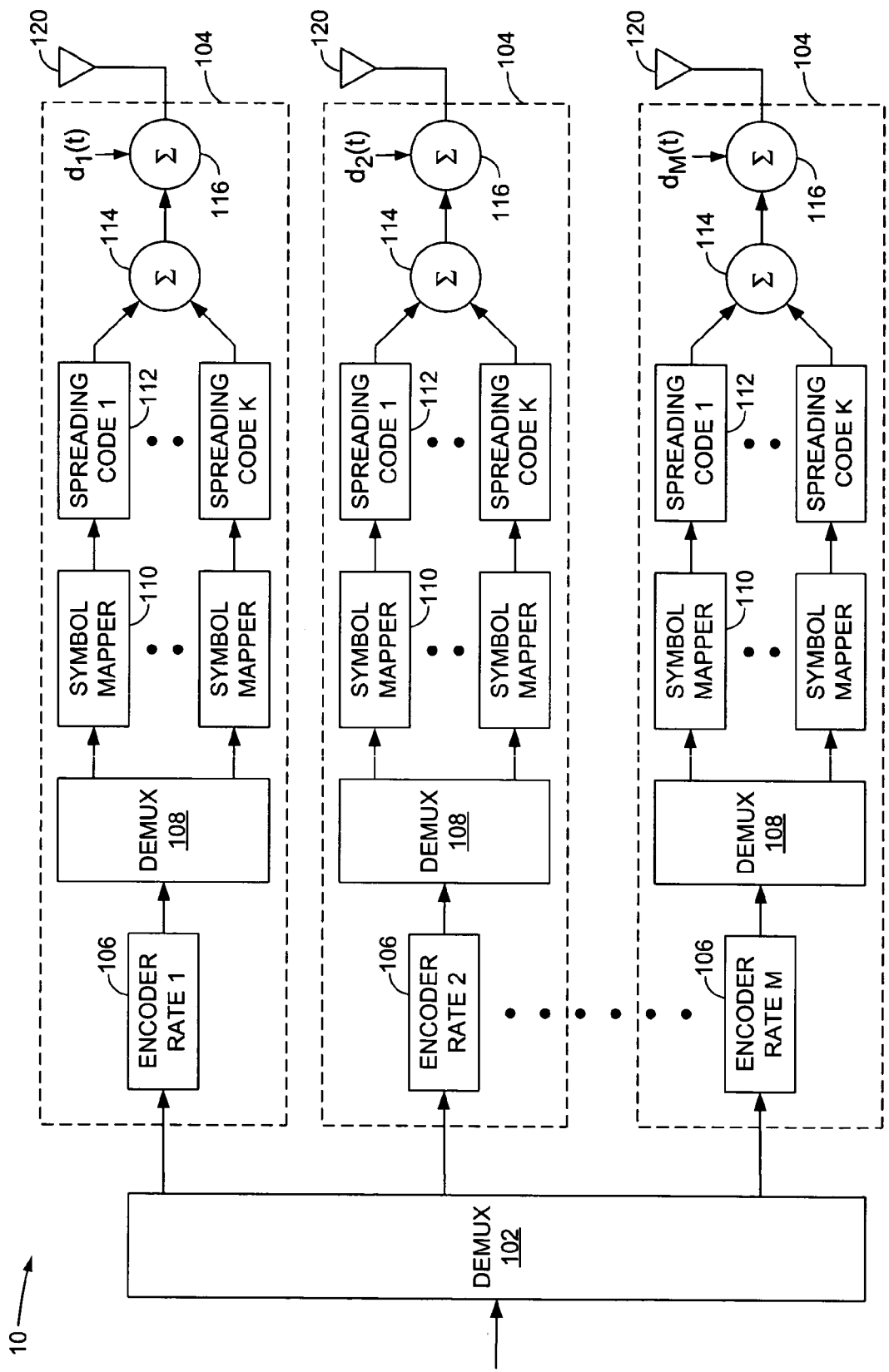
FIG. 7 is a diagram illustrating an exemplary multiple-input multiple-output (MIMO) transmitter.

These and other details are discussed more exhaustively later herein but understanding such later discussion may be aided by exploring exemplary transmitter structures, the nature of which may be exploited in configuring signal detection operations of the receiver 12. As such FIG. 7 illustrates an exemplary configuration for transmitter 10 that implements PARC. As those skilled in the art will appreciate, PARC is a multiple stream transmitting technique used in wireless communication systems to increase system capacity. Transmitter 10 in the exemplary embodiment is configured for the High-Speed Downlink Packet Access (HSDPA) mode of WCDMA.

In this exemplary configuration transmitter 10 comprises a demultiplexer 102 to divide the original information bit stream I into M bit streams $\{b_1(t), b_2(t), \ldots b_M(t)\}$, coding and modulation circuits 104 for each bit stream, and a plurality of antennas 120. The coding and modulation circuit 104 for each bit stream $\{b_1(t), b_2(t), \ldots b_M(t)\}$ comprises an encoder 106 to encode the bit stream $\{b_1(t), b_2(t), \ldots b_M(t)\}$, a plurality of demultiplexers 108 to further divide each bit stream $\{b_1(t), b_2(t), \ldots b_M(t)\}$ into sub-streams, a plurality of symbol mappers 110 to map each sub-stream to a point on a signaling constellation, a plurality of signal spreaders 112 to apply a selected spreading code to each sub-stream, and a combiner 114 to recombine the sub-streams. The encoders 106 for each bit stream $\{b_1(t), b_2(t), \ldots b_M(t)\}$ encode the original information bits at different rates. The rates depend on the channel quality indicator (CQI) feedback from the receiver.

The coded signal output by each encoder 106 is then divided into K substreams by demultiplexers 108. Each sub-stream is mapped to symbols by one of K symbol mappers 110, and spread with one of K spreading codes by signal spreaders 112. The K spreading codes may be reused on the different antennas 120. The combiner recombines the K spread signals from each signal spreader 112. The output of each combiner 114 is then combined by combiner 116 with one or more other signals $d_m(t)$ transmitted simultaneously with the coded signals. The signals $d_m(t)$ may contain a number of dedicated channels, control channels, as well as a common pilot channel, and together model as own-cell interference. In FIG. 2, the number of coded signals and the number of transmit antennas 120 are the same. However, in other embodiments, the number of coded signals could be equal to or fewer than the number of transmit antennas 120. The choice of how many and which transmit antennas 120 to use can be based on some metric, such as the measured signal quality corresponding to each transmit antenna 120.

Figure 8:
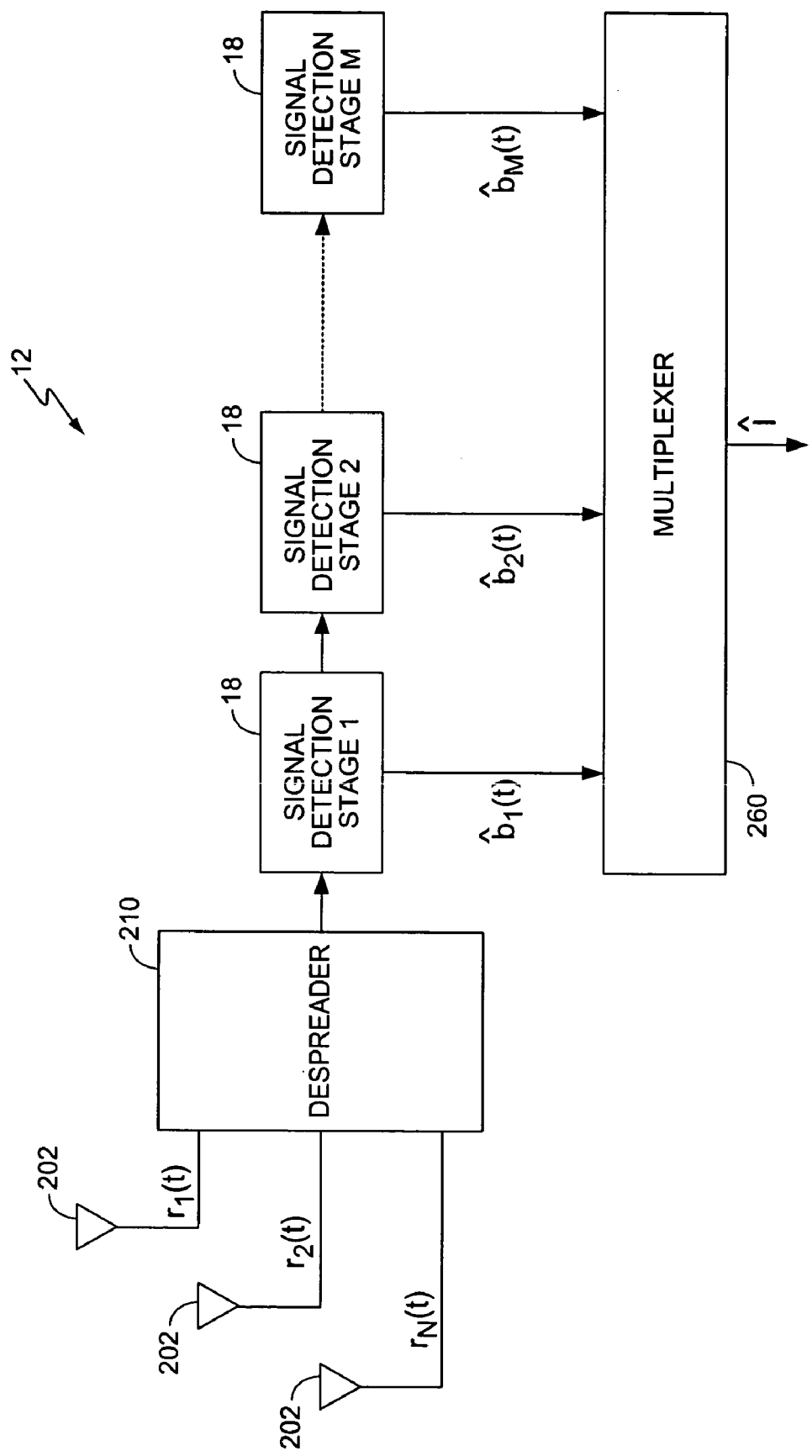
FIG. 8 is a diagram illustrating further exemplary details for a receiver according to one or more embodiments of the present invention.

FIG. 8 illustrates exemplary partial details for receiver 12 that are consistent with the overall architecture given in FIG. 2 but provides additional PARC-related information. As noted before, receiver 12 uses GRAKE techniques in combination with Successive Interference Cancellation (SIC) techniques to detect a number of signals of interest using successive detection and interference cancellation. Here, each signal of interest may be a different one of the coded substreams of a PARC transmission. Receiver 12 comprises a plurality of receive antennas 202, a despreader circuit 210 coupled to the receive antennas 202, and a plurality of successive signal detection stages 18. Note that despreader circuit 210 may be the same or similar to the earlier illustrated despreader circuit 31, and that a receiver front-end as shown in FIG. 2 is omitted for simplicity of illustration but generally would be included between antennas 202 and despreader circuit 210.

Regardless, each receive antenna 202 receives a multipath signal from each transmit antenna 120. The received signal at each antenna 202 is a combination of M mutually interfering signals transmitted over K code channels. The despreader 210 despreads the received signals and outputs despread signals to the first signal detection stage 18. The despread signals represent M mutually interfering signals transmitted over one of K code channels.

Each signal detection stage 18 corresponds to one encoder 106, thus complementing the transmit structure of transmitter 10, and generates an estimate of the corresponding bit stream $b_m(t)$. In the absence of decoding errors, the output of each stage 18 will be the original information bit stream $b_m(t)$ input to the respective encoder 106 in the transmitter 10. In the transmitter 10, the coded signal output from each encoder 106 is divided and spread using K spreading codes and transmitted using a single transmit antenna 120. Those skilled in the art will recognize, however, that two or more transmit antennas 120 may be used for each encoder 106. Further, while the same K spreading codes are used with each antenna 120 in the exemplary embodiment, a different number of spreading codes could be used with each transmit antenna 120, and the spreading codes do not need to be reused. Using different spreading codes with each transmit antenna 120 would eliminate code reuse interference.

In any case, in each stage 18 the despread signals corresponding to each of the K spreading codes are weighted and combined so as to suppress ISI and MAI due to cross correlation between the K spreading codes and to suppress the self-interference or code reuse interference due to code reuse across multiple transmit antennas 120 as well as interference from $d_1(t), d_2 \ldots d_n$. The combining weights are calculated by combining weight generator 32 in each stage 18 using GRAKE-based techniques, which treat the interference as colored Gaussian noise and exploit impairment correlations across correlator outputs to achieve interference suppression.

Different GRAKE combining circuits can be used to handle different transmitter 10 configurations. In one or more exemplary embodiments, there is a one-to-one correspondence between encoders 106 and transmit antennas 120 so a linear GRAKE combining circuit is warranted. However, if the encoder outputs at the transmitter 10 were applied to more than one transmit antenna 120, a non-linear GRAKE combining circuit, such as a joint-detection GRAKE combining circuit may result in better performance. A joint detection GRAKE receiver is described in S. J. Grant, K. J. Molnar, and G. E. Bottomley, "Generalized RAKE receivers for MIMO systems," Proc. VTC'03-Fall, Orlando, Fla., October 2003, which is incorporated herein by reference. It should be understood that the RAKE combining circuits 30 illustrated for stages 18 can be designed or configured as needed for the appropriate GRAKE combining method.

After GRAKE combining, the coded bits corresponding to each of the K spreading codes are demodulated and then multiplexed together using a multiplexer 260, which may be included as part of the receiver circuit 16, or elsewhere in receiver 12. The coded signal corresponding to the first encoder 106 is decoded in the first stage 18 and output. That decoded signal, along with channel estimates and code cross correlations, are then used to generate a cancellation signal for the next stage that represents the interference attributable to the corresponding coded signal. The cancellation signal is combined with the despread signals output from the despreader 210 to create despread signals with reduced interference, which become the input signals to the second stage 18. That second stage detects the next signal of interest, generates a cancellation signal for the next stage 18, and so on.

Thus, the process described above is repeated for each stage 18, except that the last stage 18 does not need to generate a cancellation signal because once the last stage 18 is reached only a single undetected signal of interest remains. The different signals of interest contained within the received composite signal thus are successively decoded and the contribution of each successively detected coded signal is cancelled from the input signals cascaded to remaining stages 18. The combining weights change for each stage 18 to reflect the progressively reduced interference due to the cancellation performed in prior stages. After all the coded signals are decoded, the original information bit stream may be reconstructed by multiplexer 260 to produce an estimated bit stream $\hat{I}$.

Figure 9:
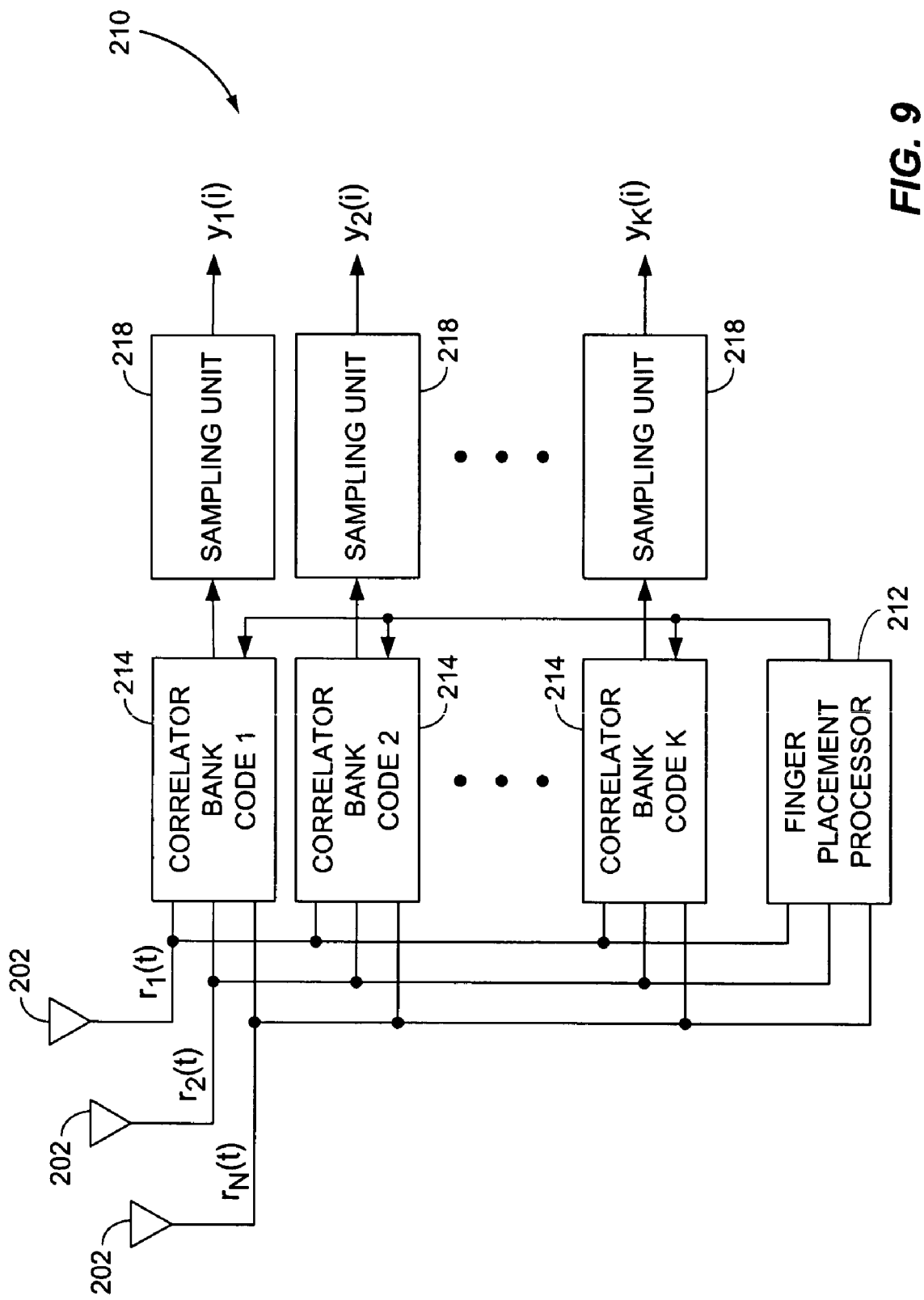
FIG. 9 is a diagram illustrating exemplary despreader circuit details.

FIG. 9 shows the despreader circuit 210. Despreader 210 comprises a plurality of correlator banks 214 and a plurality of sampling units 218. Each correlator bank 214 comprises one or more correlators, also known as RAKE fingers, tuned to one of the K spreading codes and spanning the multiple receive antennas 202. A finger placement processor 212 may place the finger delays of the RAKE fingers comprising each correlator bank 214 in the same manner as a conventional single-antenna GRAKE receiver. For example, finger placement processor 212 may place the RAKE fingers to maximize the signal to interference plus noise ratio (SINR) at the output of the GRAKE combining circuit in the first stage 18. The RAKE finger outputs are then sampled at the symbol intervals $t=iT$ by sampling units 218 to generate a plurality of despread vectors denoted $y_K(i)$ at each ith symbol interval. The despread vector $y_K(i)$ represents a composite of M coded signals transmitted from M transmit antennas 120 over the kth code channel.

Figure 10:
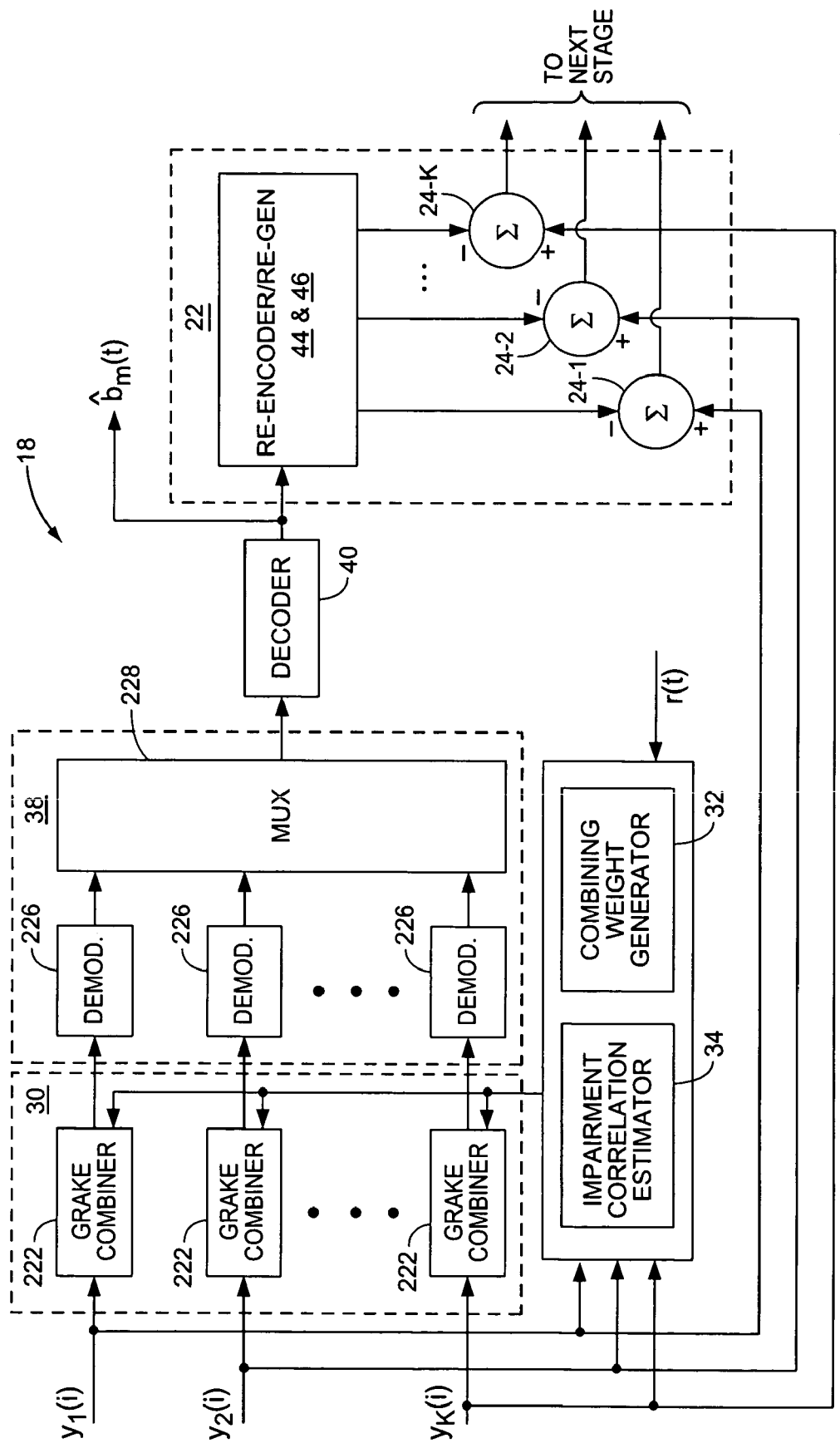
FIG. 10 is a diagram illustrating further exemplary details for signal detection and cancellation in one stage of an exemplary receiver circuit according to one or more embodiments of the present invention.

FIG. 10 illustrates exemplary details for a signal detection stage 18. In the illustrated embodiment, each stage 18 comprises a plurality of GRAKE combining circuits 222, which may be considered as collectively comprising the earlier illustrated RAKE combining circuit 30. Each stage 18 further comprises combining weight calculator 32, a plurality of demodulators 226 and an associated multiplexer 228, which together may comprise the earlier illustrated demodulator and circuit 38, and decoder 40. The output of the decoder 40 comprises decoded bits representing estimates of the information bits $b_m(t)$ input to a corresponding encoder 106 at the transmitter 10. Absent errors, the decoded bits match the original information bits. Also, as illustrated, signal regeneration circuit 22 comprises re-encoder 46 and signal regenerator 44, along with one or more summing circuits 24. As before, the signal regeneration circuit 22 provides cancellation of the detected signal of interest from the stage input signal provided to the next stage 18.

Each stage 18 has inputs $\{y_1(i), y_2(i), \ldots, y_K(i)\}$. In the first stage 18, the input signals $\{y_1(i), y_2(i), \ldots, y_K(i)\}$ are the despread vectors $y_K(i)$ output by the despreader 210. In subsequent stages 18, the input signals are the cascaded despread vectors with successively reduced interference by virtue of the successive cancellation of signals detected by the prior stages 18. The GRAKE combining circuits 222 weight and combine each despread vector $y_K(i)$ using the same combining weight vector $w_m$. The subscript m denotes the mth stage 18 within the chain. The GRAKE combining circuits 222 perform combining based on the outputs from the impairment correlation estimator 34, which computes impairment correlations between the despread values of the stage input signal. Combining weight generator 32 computes the combining weight vector $w_m$ for its associated stage 18 based on the impairment correlations provided by estimator 34.

The combining weights for each stage 18 are different, which reflects the successive cancellation of interference as signal processing progresses through the succession of detection stages 18. Note that in one or more exemplary configurations, a single combining weight generator 32 may be used to calculate the combining weight vector $w_m$ for each stage 18, or separate combining weight generators 32 may be used in each stage 18 to calculate the combining weight vectors $w_m$ for each stage 18.

An exemplary combining weight vector $w_m$ for each stage 18 is given by:

$$w_m = R_x^{-1}(m) h_m. \qquad \text{Eq. 1}$$

In Eq. 1, the gain vector $h_m$ describes the frequency selective fading channel between mth transmit antenna 120 and the multiple receive antennas 202. The gain vector $h_m$ is a function of the tap gains and delays of this channel as well as the chip pulse autocorrelation function. $R_x(m)$ is the covariance matrix of the impairment vector $x_{mk}(i)$ "seen" by the mth stage 18 when detecting the ith symbol on the kth multicode. As noted, impairment correlation estimator 34 provides the needed impairment correlation (covariance) estimates.

Such impairment may comprise one or more of the following components:

1. Self interference from the kth multicode on the other antennas M+1, M+2, ..., M due to code reuse across antennas.
2. ISI from the kth multicode on antenna M
3. MAI from the other K−1 multicodes on antennas M, M+1, ... M
4. MAI from the signals $\{d_m(t)\}_{m=1}^{M}$
5. Noise (may include other-cell interference)

The outputs of the GRAKE combining circuits 222 represent the transmit symbols corresponding to a single coded signal that was demultiplexed at the transmitter 10 and transmitted to receiver 12 over multiple code channels. In an exemplary embodiment, the transmit symbols corresponding to the same coded signal are transmitted from a single transmit antenna 120, but could be divided between two or more transmit antennas 120.

Demodulators 226 receive the received symbols output by the GRAKE combining circuits 222 and demodulate each of the K symbols $\{c_{mk}(i)\}_{k=1,K}$ transmitted from the mth transmit antenna 120 at the ith symbol period. The output of each demodulator 226 during each symbol period are the soft values corresponding to the input to the kth modulator 110 for the mth transmit antenna 120. Multiplexer 228 multiplexes the soft bit values output from the demodulators 226, thereby reversing the process performed by the corresponding demultiplexer 108 for the mth transmit antenna 120 as shown in FIG. 7. The output of the multiplexer 228 thus is an estimate of the coded signal output from the encoder 106 for the mth transmit antenna 120. With this operation, as noted above, decoder 40 decodes the soft value estimates of the coded signal output from the multiplexer 228 to generate decoded bits representing an estimate $\hat{b}_m(t)$ of the original information bits that were input to mth encoder 106 and transmitted by the mth transmit antenna 120.

The decoder 40 thus is matched to the mth encoder 106. The decoder 40 may, for example, comprise a conventional Viterbi decoder or a conventional MAP decoder. Indeed, any known decoding techniques may be used as needed or desired. Because the decoding methods selected are not material to the invention and are well known to those skilled in the art, the decoding techniques are not described herein.

With knowledge of the information bits $\hat{b}_m(t)$ transmitted by the mth antenna, a cancellation signal can be generated and used to cancel the contribution of the mth coded signal to the despread vectors $\{y_1(i), y_2(i), \ldots, y_K(i)\}$. Signal regeneration circuit 22 generates a cancellation signal corresponding to the mth coded signal based on the estimated information bits $\hat{b}_m(t)$, channel estimates, and code cross-correlations between the different spreading codes, which cross-correlations may be computed during despreading operations at despreader 210. Alternatively, such information can be pre-computed and stored within receiver memory.

The cancellation signal in this embodiment comprises a set of cancellation vectors that are subtracted by summing nodes 24 from the despread signal vectors that were provided as the stage input signal for the current stage 18-m. The resulting reduced interference signal is provided as the stage input signal for the next stage 18-(m+1). In this way the contribution of the mth coded signal is removed from the signal input to the m+1 stage, thus reducing the interference "seen" by that next stage 18.

Figure 11:
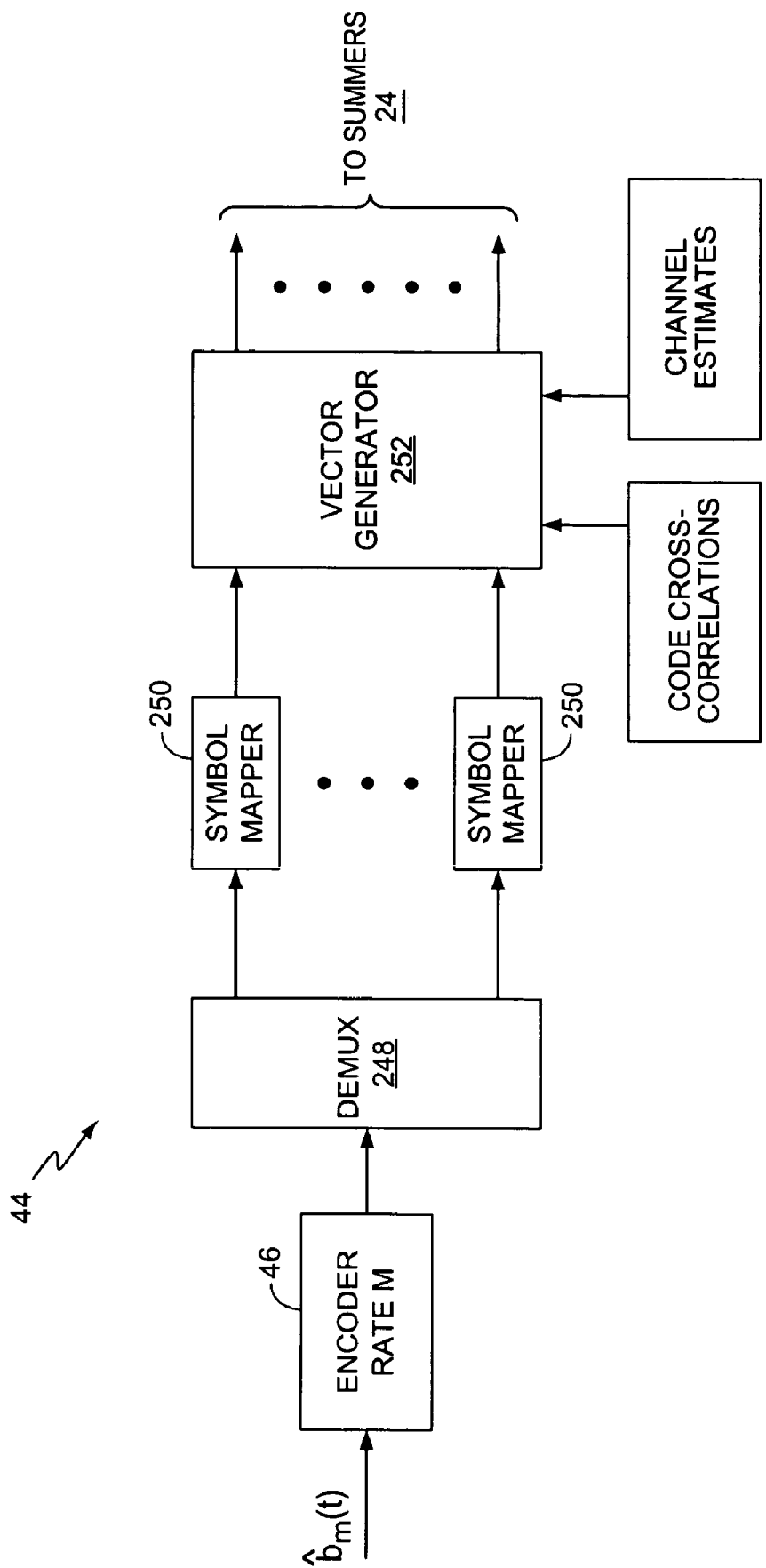
FIG. 11 is a diagram illustrating exemplary signal regeneration details for successive cancellation operations.

FIG. 11 illustrates an exemplary signal regenerator 44 within signal regenerator circuit 22. The signal regenerator 44 is shown here in conjunction with re-encoder 46 and complements the transmitter architecture shown in FIG. 7. Signal regenerator 44 comprises a demultiplexer 248 coupled to the output of encoder 46, a plurality of modulators 250, also referred to as "mappers," and a vector generator 252. Encoder 46 re-encodes the estimated information bits $\hat{b}_m(t)$ output from the decoder 40 to generate an estimate of the mth coded signal output by the mth encoder 106 at the transmitter 10. The coded bits output by encoder 46 are then divided into K substreams corresponding to each of the K spreading codes by demultiplexer 248.

Demultiplexer 248 divides the coded signal into substreams in the same manner as the demultiplexer 108 at the transmitter 10 for the mth transmit antenna 120. Symbol mappers 250 map the coded bits to corresponding modulation symbols to generate estimates $\{\hat{c}_{mk}(i)\}_{k=1}^{K}$ of the transmit symbols transmitted by the mth transmit antenna 120. The encoder 46, demultiplexer 248, and symbol mappers 250 may be configured like the corresponding functional components at the transmitter 10. Vector generator 252 generates the vector component of the despread vectors $\{y_1(i), y_2(i), \ldots, y_K(i)\}$ due to the estimated transmit symbols using the code cross-correlation functions between the K different spreading waveforms as well as estimates of the channel between the mth transmit antenna 120 and the multiple receive antennas 202.

The output of the vector generator 252 thus is a set of cancellation vectors, where each reconstructed cancellation vector corresponds to a respective code channel. The channel estimates are obtained from the common pilot channel in a conventional manner and are scaled by the fraction of power allocated to the pilot. Consequently, the reconstructed interference vectors must be scaled by the power offset between the common pilot channel and the data channel in order to completely remove the interference from the mth transmit antenna 120.

It will be apparent to those skilled in the art that the interference signal may be generated from the estimate of the coded signal rather than the decoded signal. In other words, as described before, signal regeneration can be simplified somewhat by re-encoding a stream of coded bits obtained by making hard decisions on the soft values output by demodulator 38 without benefit of any decoding operations. In such cases, the signal regeneration circuit would not use encoder 46. Alternatively, the signal regeneration circuit 22 could use bits obtained from the outputs of the demodulators 226 (e.g., hard-detected bits obtained from the soft values) and thus might omit encoder 46 and demultiplexer 248. Further, if such bits are used directly by signal regeneration circuit 22, the mux 228 of FIG. 10 also could be omitted.

Regardless, the computation of the combining weight vector $w_m$ given by Eq. 1 requires computation of the net response vector $h_m$ and covariance matrix $R_x(m)$. The qth element of the net response vector $h_m$ is given by:

$$\{h_m\}_{q(l)} = \sum_{p=1}^{P} g_{lmp} x(\tau_{q(l)} - \tau_{lmp}). \quad \text{Eq. 2}$$

Strictly speaking, q is a function of the receive antenna index l since the finger index spans L receive antennas 202. The notation q(l) is therefore used to denote this dependence. In Eq. 2, $x(\cdot)$ is the chip pulse autocorrelation function; P is the number of channel taps; $g_{lmp}$ and $\tau_{lmp}$ are the gain and delay, respectively, of the pth tap of the channel between the mth transmit antenna 120 and the ith receive antenna 202; and $\tau_{q(l)}$ is a finger delay.

The impairment covariance matrix $R_x(m)$ is given by:

$$R_x(m) = R_s(m) + R_d + R_n. \quad \text{Eq. 3}$$

The matrix $R_s(m)$, referred to herein as the multicode impairment matrix, captures the impairments attributable to the use of multiple transmit antennas 120, and multiple spreading codes, which represent the first three impairment elements listed above. The matrix $R_d$, referred to herein as the multiple access impairment matrix, captures the MAI attributable to other transmit signals, such as the pilots, dedicated, and overhead channels, i.e., the fourth impairment listed above. The matrix $R_n$, referred to herein as the noise impairment matix, captures the noise portion of the impairment.

The elements of the multicode impairment matrix $R_s(m)$ are given by:

$$\{R_s(m)\}_{q(l_1),q(l_2)} = \frac{E_T}{K} \sum_{n=m+1}^{M} \alpha_s(n) \quad \text{Eq. 4}$$

$$\sum_{p_1=1}^{P} \sum_{p_2=1}^{P} g_{l_1 n p_1} g^*_{l_2 n p_2} x(\tau_{q(l_1)} - \tau_{l_1 n p_1}) x^*(\tau_{q(l_2)} - \tau_{l_2 n p_2}) +$$

$$\frac{E_T}{SF} \sum_{n=m}^{M} \alpha_s(n) \sum_{p_1=1}^{P} \sum_{p_2=1}^{P} g_{l_1 n p_1} g^*_{l_2 n p_2} \cdot$$

$$\sum_{\substack{j=-\infty \\ j \neq 0}}^{\infty} x(jT_c + \tau_{q(l_1)} - \tau_{l_1 n p_1}) x^*(jT_c + \tau_{q(l_2)} - \tau_{l_2 n p_2}).$$

In this expression, SF is the spreading factor, $T_c$ is the chip period, and $\alpha_s(n)$ is the fraction of the total energy per-symbol, $E_T$, that is allocated to the nth data substream. The first term with the summation for $n=m+1 \ldots M$ captures the self-interference due to code reuse, and the second term with the summation for $n=m \ldots M$ captures the ISI and MAI from the use of multiple spreading codes. The partial summations reflect the fact that interference associated with signals of interest detected in any prior stages 18 has been cancelled. This makes the impairment covariance matrix $R_x(m)$ and thus the combining weight vector $w_m$ different at each stage 18.

The elements of the multiple access impairment matrix $R_d$ are given by:

$$\{R_d\}_{q(l_1),q(l_2)} = \quad \text{Eq. 5}$$

$$\frac{E_T}{SF} \sum_{m=1}^{M} \alpha_d(m) \sum_{p_1=1}^{P} \sum_{p_2=1}^{P} g_{l_1 m p_1} g^*_{l_2 m p_2} \cdot \sum_{\substack{j=-\infty \\ j \neq 0}}^{\infty} x(jT_c + \tau_{q(l_1)} - \tau_{l_1 m p_1})$$

$$x^*(jT_c + \tau_{q(l_2)} - \tau_{l_2 m p_2}),$$

where $\alpha_d(m)$ is the fraction of the total energy allocated to the signal $d_m(t)$. In contrast to $R_s(m)$, the first summation in Eq. 5 runs from $m=1 \ldots M$, i.e., over all transmit antennas 120. This is because the interference from the pilot, dedicated, and overhead channels is not removed in the successive interference cancellation process.

The elements of the noise matrix $R_n$ are given by:

$$\{R_n\}_{q(l_1),q(l_2)} = N_o x(\tau_{q(l_1)} - \tau_{q(l_2)}) \delta(l_1 - l_2), \quad \text{Eq. 6}$$

where $N_o$ is the noise power spectral density and $\delta(\cdot)$ is the Dirac-delta function. Eq. 6 assumes that the noise processes on different receive antennas 202 is uncorrelated. In order to calculate the GRAKE combining vector at each stage, the receiver estimates the gain vector $h_m$ and impairment covariance matrix $R_x(m)$. The gain vector $h_m$ may be easily estimated using the despread values from the pilot channel in a similar manner to a conventional GRAKE receiver. However, for this to work, it is assumed that a different pilot is used on each antenna 120 at the transmitter 10. Denoting $y_m^{polit}(i)$ as the despread pilot vector corresponding to the pilot on the mth transmit antenna, an estimate of the gain vector $h_m$ is given by the following time average over the duration of the coding frame:

$$\hat{h}_m = \langle y_m^{Pilot}(i) c_{p,m}^*(i) \rangle, \qquad \text{Eq. 7}$$

where $c_{p,m}^*(i)$ are the known pilot symbols.

The impairment covariance matrix $R_x(m)$ for the mth stage may be formed explicitly through the above equations using estimates of the channel tap gains and finger delays. The channel estimates should be scaled by the power offset between the pilot and data channels. Furthermore, the noise power $N_o$ needs to be estimated in some manner. Alternatively, the impairment covariance matrix $R_x(m)$ may be estimated by performing a time average on the despread vector at the input to each stage 18 of the receiver circuit 16. If we denote $y_{mk}(i)$ as the input to the mth stage, then the estimate of the impairment covariance matrix $R_x(m)$ is given by:

$$\hat{R}_x(m) = \langle y_{mk}(i) y_{mk}^H(i) \rangle - \beta_m \hat{h}_m \hat{h}_m^H, \qquad \text{Eq. 8}$$

where $\beta_m$ denotes the power offset between the pilot and data channels on the mth transmit antenna 120.

An alternative approach is to estimate the impairment covariance matrix $R_x(m)$ for the mth stage 18 stage using an estimate of the impairment covariance matrix on the pilot channels $R_x^{pilot}$, which is referred to herein as the pilot covariance matrix. The two are different because (1) typically code reuse across transmit antennas 120 is not employed on the pilot channels, unlike on the data channels, and (2) SIC may or may not be performed on the pilot channels.

The pilot covariance matrix is estimated easily by the time average:

$$\hat{R}_x^{pilot} = \langle x_m^{pilot}(i) [x_m^{pilot}(i)]^H \rangle, \qquad \text{Eq. 9}$$

where $x_m^{pilot}(i)$ is the impairment "seen" by the mth pilot channel. This is easily calculated from the pilot despread values using the known pilot symbols and the estimated channel gain vector $h_m$ according to:

$$x_m^{pilot}(i) = y_m^{pilot}(i) - \hat{h}_m c_{p,m}^*(i). \qquad \text{Eq. 10}$$

The impairment covariance matrix $R_x(m)$ for the mth stage may then be estimated by adding a term to the pilot covariance matrix $\hat{R}_x^{pilot}$ to account for code reuse. This code reuse term, denoted $R_C$, is given by:

$$R_C = \frac{E_T}{K} \sum_{n=m+1}^{M} \alpha_s(n) \sum_{p_1=1}^{P} \sum_{p_2=1}^{P} g_{l_1 n p_1} g_{l_2 n p_2}^* x(\tau_{q(l_1)} - \tau_{l_1 n p_1}) x^*(\tau_{q(l_2)} - \tau_{l_2 n p_2}), \qquad \text{Eq. 11}$$

which is the first term of Eq. 4. Furthermore, a term must be subtracted to account for the interference that is cancelled up to the mth stage 18 of receiver 12. This term, denoted $R_{SIC}(m)$ is given by:

$$R_{SIC}(m) = \frac{E_T}{SF} \sum_{n=1}^{m-1} \alpha_s(n) \sum_{p_1=1}^{P} \sum_{p_2=1}^{P} g_{l_1 n p_1} g_{l_2 n p_2}^* \cdot \sum_{\substack{j=-\infty \\ j \neq 0}}^{\infty} x(jT_c + \tau_{q(l_1)} - \tau_{l_1 n p_1}) x^*(jT_c + \tau_{q(l_2)} - \tau_{l_2 n p_2}), \qquad \text{Eq. 12}$$

which is the second term of Eq. 4 with the first summation changed to run from $n=1 \ldots m-1$. This is true whether or not SIC is performed on the pilot channels, since SIC on the pilot channels only removes the pilot interference and not the interference due to the multiple data substreams.

To further improve performance, as noted earlier herein, the combining weights at each stage 18 may be computed to take into account the spreading code cross-correlations, which are symbol period dependent. The complexity of this technique may be reasonable, since such code cross-correlations are used in signal regeneration of despread values for interference cancellation in embodiments where a front-end despread is used and the cascaded input signals comprise streams of despread values.

Of course, as shown earlier, the cascaded input signals may not be despread and successive interference cancellation may operate such that interference may instead be cancelled from the stage input signals before they are despread internally by each stage 18. This approach allows RAKE finger placements to be optimized at each stage 18 rather than fixed in a common despreader circuit shared by all stages 18. The trade-off is that despreading and respreading must be performed at each stage 18 as part of signal detection and interference cancellation.

Figure 12:
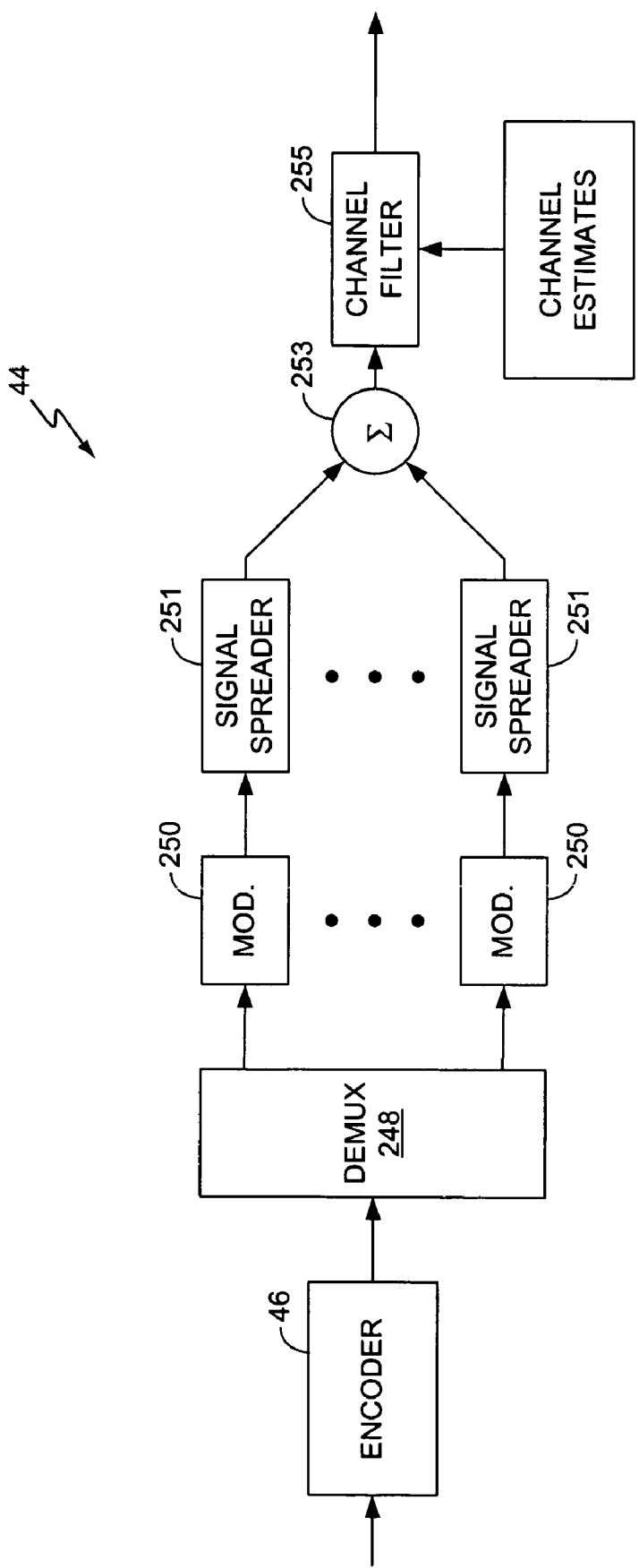
FIG. 12 is a diagram illustrating alternate exemplary signal regeneration details for successive cancellation operations.

With respect to such per-stage cancellation, FIG. 12 shows an exemplary embodiment of the signal regenerator 44 for embodiments of receiver circuit 16 wherein the cascaded stage input signals comprise received signal samples, i.e., each stage includes despreading circuits 30 as illustrated in FIG. 5, for example. The particular circuit illustrations depicted may have particular use with respect to the transmitter architecture shown in FIG. 7.

Here signal regenerator 44 again is associated with the (optional) encoder 46 and comprises a demultiplexer 248, a plurality of symbol mappers 250, a plurality of spreaders 251, a combiner 253, and a filter circuit 255. Encoder 46 re-encodes the information bits output from the decoder 40 to generate an estimate of the coded bits output by the encoder 106 for the mth transmit antenna 120. The coded bits output by encoder 46 (or by hard decision processor 42 as shown in FIG. 6) are then divided into K substreams corresponding to each of the K spreading codes. Demultiplexer 248 divides the coded bits into coded substreams in the same manner as the demultiplexer 108 at the transmitter 10 for the mth transmit antenna 120.

Symbol mappers 250 map the bits of those coded substreams into modulation symbols to generate the estimates $\{\hat{c}^{mk}(i)\}_{k=1}^{K}$ of the transmit symbols transmitted by the mth transmit antenna 120. Spreaders 251 spread the transmit symbols output from the symbol mappers 250 using the same spreading codes employed by the transmitter 10. The encoder 46, demultiplexer 248, symbol mappers 250, and spreaders 251 may be configured like the corresponding functional components at the transmitter 10. Combiner 253 combines the spread signals to form an estimate of the transmit signal attributable to the mth coded signal.

Channel filter 255 filters the estimated transmit signal using the estimated channel coefficients associated with the mth transmit antenna 120. Separate channel filtering within channel filter 255 may be used for each receive antenna 202 to reflect the particular channel characteristics from the mth transmit antenna 120 to the Lth receive antennas 202. The filtered signals output from the channel filter 255 are then subtracted from the input signals to the mth stage 18. (Despreader 210 in FIG. 8 may be omitted in this context.)

In the exemplary embodiments described at least with respect to the transmitter structure of FIG. 7, it was assumed that the transmitter 10 used a single encoder 106 for K spreading codes, and that a different encoder 106 was used on each transmit antenna 120. Consequently, each stage 18 corresponded to one of M transmit antennas. It should be noted, of course, that in other embodiments a single encoder 106 at the transmitter 10 could be associated with two or more transmit antennas 120, or two or more encoders 106 could be associated with a single transmit antenna 120. Furthermore, a different number of spreading codes could be used with each transmit antenna 120.

In these and other such cases, it should be understood that the present invention may be used to detect and decode the transmit signals of interest. Indeed, those skilled in the art will immediately appreciate that the basic structure and processing logic described herein can be adapted to a wide range of transmitter arrangements.

In other variations, the calculation of combining weights need not use a maximum likelihood (ML) approach. An alternative is to use minimum-mean-squared-error (MMSE) method for calculation of combining weights. The performance is the same using either approach; however, MMSE combining weights are simpler to calculate since they are based on the data covariance matrix $R_y(m)$ rather than the impairment covariance matrix $R_x(m)$. Using the MMSE approach, the combining weight vector $w_m$ is given by:

$$w_m^{MMSE} = R_y^{-1}(m) h_m. \qquad \text{Eq. 13}$$

The data covariance matrix $R_y(m)$ may be estimated based on a time average of the despread vectors $\{y_{11}(i), y_2(i), \ldots, y_K(i)\}$ at the input to the mth stage 18 according to:

$$\hat{R}_y(m) = \langle y_{mk}(i) y_{mk}^H \rangle(i). \qquad \text{Eq. 14}$$

Computing the data covariance matrix is simpler than computing the impairment covariance matrix because knowledge of the power offset $\beta_m$ is not required. The ML and MMSE combining weights are related by a real-valued scale factor:

$$w_m^{MMSE} = (1 - q_m) w_m^{ML}, \qquad \text{Eq. 15}$$

where $q_m = h_m^H R_y^{-1}(m) h_m$. Thus, the SINR at each stage of the receiver 12 will be the same using either the ML or MMSE approach to computing combining weights.

In the context of SINR calculations, it should be noted that an exemplary embodiment of the present invention can be configured to carry out such calculations in a first or second mode of operation corresponding to active and inactive data reception states. For example, assuming that receiver 12 receives data at scheduled times and waits at other times while other receivers (i.e., users) are being served, then an exemplary received signal quality measurement method complements those mode changes.

More particularly, in one or more embodiments of the present invention, the receiver circuit 16 is configured to generate per-stage SINR estimates that are, for example, reported back to a supporting wireless communication network. In active reception mode, receiver circuit 16 obtains these SINR estimates based on the signal detection operations carried out by the individual stages 18, i.e., based on receiving data conveyed by the signals of interest. In non-active mode where the receiver 12 is not being served, the exemplary receiver circuit 16 is configured to obtain SINR estimates for each stage 18 based on the pilot correlations as described above.

In this latter case, one assumes that pilot signals are available from the various transmitting antennas, and it should be noted that a pilot correlation matrix constructed based on the received pilots is directly applicable to SINR estimates for the first stage 18 in the chain. SINR estimates for each succeeding stage 18 may be derived by receiver circuit 16 based on its postulation of the interference reduction effects that would be obtained in each succeeding stage. Thus, receiver circuit 16 may start with the initial pilot correlation matrix and then derive further pilot correlation matrices for SINR estimation in the subsequent stages 18 by successively modifying the matrix for each stage based on the postulated interference removal of each stage 18. Such processing allows receiver 12 to report back estimated per-stage SINRs even when receiver 12 is not currently being served. Such reports may be useful to the network for a variety of reasons, not the least of which includes opportunities to improve scheduling, configure optimum per-signal data rates for the different signals of interest (e.g., substreams) that will be used to serve receiver 12, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of processing a received composite communication signal that includes two or more signals of interest, the method comprising:
   individually detecting the signals of interest in successive ones in a series of signal detection stages;
   canceling the signal of interest detected in each stage with respect to an input signal provided to the next stage in the series; and
   wherein, in each stage, detecting a signal of interest comprises generating combining weights as a function of impairment correlations for despread values of the input signal for that stage, and combining the despread values according to the combining weights and further comprises demodulating the combined despread values to obtain soft values representing estimates of detected bits in the signal of interest.

2. The method of claim 1, further comprising providing the soft values obtained in each stage to a decoder circuit, and decoding the soft values to obtain decoded bits for each signal of interest.

3. The method of claim 2, wherein canceling the signal of interest detected in each stage with respect to an input signal provided to the next stage in the series comprises generating hard-detected bits by making hard decisions on the soft values, re-spreading the hard-detected bits to generate a cancellation signal, and subtracting the cancellation signal from the input signal provided to the next stage.

4. The method of claim 2, wherein canceling the signal of interest detected in each stage with respect to an input signal provided to the next stage in the series comprises generating hard-detected bits by making hard decisions on the soft values, forming despread values based on the hard-detected bits to generate a cancellation signal, and subtracting the cancellation signal from the input signal provided to the next stage.

5. The method of claim 2, wherein the detected bits comprises coded bits, and wherein canceling the signal of interest detected in each stage with respect to an input signal provided to the next stage in the series comprises decoding the soft values to obtain decoded bits, re-encoding the decoded bits to obtain re-encoded bits, re-spreading the re-encoded bits to generate a cancellation signal, and subtracting the cancellation signal from the input signal provided to the next stage.

6. The method of claim 2, wherein the detected bits comprise coded bits, and wherein the canceling the signal of interest detected in each stage with respect to an input signal provided to the next stage in the series comprises decoding the soft values to obtain decoded bits, re-encoding the decoded bits to obtain re-encoded bits, forming despread values based on the re-encoded bits to generate a cancellation signal, and subtracting the cancellation signal from the input signal provided to the next stage.

7. The method of claim 1, further comprising despreading the received composite signal in a set of correlators configured to output streams of despread values for use in forming the input signals to each stage.

8. The method of claim 7, canceling the signal of interest detected in each stage with respect to an input signal provided to the next stage in the series comprises regenerating despread values corresponding to the signal of interest detected by the stage and subtracting those despread values from the streams of despread values provided as the input signal to the next stage.

9. The method of claim 1, further comprising computing the impairment correlations for each stage based on based on pilot signals received in association with the signals of interest.

10. The method of claim 9, further comprising, at least during a first mode of operation, calculating an impairment correlation matrix for the first stage based on the pilot signals received in association with the signals of interest, and calculating addition impairment correlation matrices for the successive stages based on postulating effects of successive interference cancellation by those successive stages.

11. The method of claim 10, further comprising computing a signal quality measurement for each stage based on the impairment correlation matrix computed for each stage for reporting to a supporting wireless communication network.

12. The method of claim 1, further comprising, for each stage, computing the impairment correlations for each stage based on estimating impairment correlations between the despread values of the stage input signal.

13. The method of claim 1, further comprising computing the impairment correlations for each stage based on one or more pilot signal correlation matrices computed for pilot signals received in association with the signals of interest.

14. The method of claim 13, wherein computing the impairment correlations for each stage based on one or more pilot signal correlation matrices comprises combining a pilot correlation matrix with a code reuse matrix to account for code reuse interference between the signals of interest.

15. The method of claim 13, wherein computing the impairment correlations for each stage based on one or more pilot signal correlation matrices comprises combining the pilot correlation matrix with an interference matrix to account for cancelled interference.

16. A method of processing a received composite communication signal using a plurality of successive signal detection stages, the method comprising:

deriving stage input signals from the received composite communication signal for input to respective ones of the stages;

generating impairment correlations in each stage for the despread values of the stage input signal by calculating impairment correlations between different streams of despread values of the stage input signal, wherein the different streams correspond to despread values output by different RAKE fingers of a despreading circuit;

detecting a signal of interest conveyed in the composite communication signal in each stage by combining the despread values of the stage input signal based on the impairment correlations by generating RAKE combining weights based on the impairment correlations determined for that stage, combining the different streams of despread values based on the RAKE combining weights to form a combined signal, and demodulating the combined signal to obtain a demodulated signal and detecting the signal of interest from the demodulated signal; and canceling the signals of interest detected in prior signal detection stages from the stage input signals of succeeding stages.

17. The method of claim 16, wherein detecting the signal of interest from the demodulated signal comprises decoding soft demodulation values to obtain decoded bits of the signal of interest.

18. The method of claim 16, wherein generating the RAKE combining weights based on the impairment correlations comprises generating the RAKE combining weights based on the impairment correlations and on net response estimates.

19. The method of claim 16, wherein demodulating the combined signal to obtain a demodulated signal and detecting the signal of interest from the demodulated signal comprises demodulating the combined despread values to obtain soft values corresponding to detected bits in the signal of interest, and, wherein for each but the last stage, canceling the signals of interest detected in prior signal detection stages from the stage input signals of succeeding signal detection stages comprises generating a cancellation signal based on the soft values, and subtracting the cancellation signal from the stage input signal provided to the next stage.

20. The method of claim 19, wherein the detected bits correspond to coded bits in the signal interest, and wherein generating a cancellation signal based on the soft values comprises decoding the soft values to obtain decoded bits for the signal of interest, re-encoding the decoded bits to obtain re-encoded bits that benefit from any error corrections made during decoding the soft values, and generating the cancellation signal from the re-encoded bits.

21. The method of claim 19, wherein generating a cancellation signal based on the soft values comprises making hard decisions on the soft values to obtain hard-detected bits for the signal of interest, and generating the cancellation signal from the hard-detected bits.

22. The method of claim 21, further comprising decoding the soft values from each stage to obtain decoded bits for the detected bits from each stage independent of the hard-detected bits used in each stage to generate the cancellation signals.

23. The method of claim 16, wherein canceling the signals of interest detected in prior signal detection stages from the stage input signals of succeeding signal detection stages comprises, in each but the last signal detection stage:
   respreading the detected signal of interest to form a cancellation signal; and
   combining the cancellation signal with the stage input signal for the next stage.

24. The method of claim 23, wherein combining the cancellation signal with the stage input signal for the next stage comprises subtracting the cancellation signal from the stage input signal for the next stage.

25. The method of claim 23, wherein respreading the detected signal of interest to form a cancellation signal comprises respreading coded bits recovered from the signal of interest according to corresponding channel estimates calculated for the signal of interest.

26. The method of claim 16, wherein canceling the signals of interest detected in prior stages from the stage input signals of succeeding stages comprises, in each but the last stage:
   generating a cancellation signal as despread values corresponding to the signal of interest; and
   combining the cancellation signal with the stage input signal for the next stage.

27. The method of claim 26, wherein generating a cancellation signal as despread values corresponding to the signal of interest comprises generating despread values corresponding to coded bits associated with the signal of interest and wherein the despread values account for code cross-correlations determined in association with despreading the received composite signal.

28. The method of claim 26, wherein generating a cancellation signal as despread values corresponding to the signal of interest comprises generating the despread values based on channel estimates corresponding to the signal of interest and code cross-correlations determined in association with despreading the received composite signal.

29. A receiver circuit to receive a composite communication signal comprising:
   a plurality of successive signal detection stages, each stage comprising a RAKE combining circuit configured to detect a signal of interest received in the composite communication signal by combining despread values of a stage input signal that is derived from the received composite communication signal and each but the last stage further comprising a signal regeneration circuit configured to cancel the signal of interest detected by that stage from the stage input signal provided to the next signal detection stage; and
   said RAKE combining circuit configured to generate RAKE combining weights used in detecting the signal of interest based on one or more impairment correlations between the despread values of the stage input signal.

30. The receiver circuit of claim 29, wherein each stage further comprises a combining weight generator circuit to generate the RAKE combining weights, and wherein the combining weight generator circuit comprises or is associated with an impairment correlation estimator that is configured to estimate the one or more impairment correlations between the despread values of the stage input signal.

31. The receiver circuit of claim 29, wherein the RAKE combining weight generator is configured to generate the combining weights based on net channel estimates and the impairment correlations.

32. The receiver circuit of claim 29, wherein the impairment correlation estimator is configured to estimate at least one of the following impairment correlations: interference correlations and thermal noise correlations.

33. The receiver circuit of claim 32, wherein the impairment correlation estimator comprises a processing circuit configured to estimate one or more impairment correlations between different streams of despread values of the stage input signal, and wherein the different streams correspond to despread values output by different RAKE fingers of a despreading circuit included in the receiver circuit.

34. The receiver circuit of claim 29, further comprising a decoding circuit configured to receive a demodulated signal from each stage comprising soft values corresponding to detected bits in the signal of interest detected by that stage, and further configured to decode the soft values in each demodulated signal to recover decoded bits for all the signals of interest.

35. The receiver circuit of claim 29, wherein each stage comprises a demodulator to generate a demodulated signal comprising soft values corresponding to detected bits of the signal of interest, and further comprises a decoder to generate decoded bits from the soft values, and wherein the decoded bits are taken as the signal of interest detected by that stage.

36. The receiver circuit of claim 29, wherein the RAKE combining circuit is configured to calculate impairment correlations between different streams of despread values of the stage input signal, wherein the different streams correspond to despread values output by different RAKE fingers of a despreading circuit.

37. The receiver circuit of claim 36, wherein each stage is configured to detect a signal of interest by:
   generating RAKE combining weights based on the impairment correlations;
   combining the different streams of despread values of the stage input signal based on the RAKE combining weights to form a combined signal; and
   demodulating the combined signal to obtain a demodulated signal and detecting the signal of interest from the demodulated signal.

38. The receiver circuit of claim 37, wherein the receiver circuit is configured to detect each signal of interest from the corresponding demodulated signal generated in each stage by decoding soft demodulation values to obtain decoded bits of the signal of interest.

39. The receiver circuit of claim 29, wherein each stage is configured to demodulate the combined despread values to obtain soft values corresponding to detected bits of the signal of interest, and wherein each signal regeneration circuit is configured to generate a cancellation signal that is based on the soft values and to subtract the cancellation signal from the stage input signal provided to the next stage.

40. The receiver circuit of claim 39, wherein each stage is configured to decode the soft values to obtain decoded bits for the signal of interest, and wherein each signal regeneration circuit is configured to re-encode the decoded bits to obtain re-encoded bits that benefit from any error corrections made during decoding the soft values, to generate the cancellation signal from the re-encoded bits, and to subtract the cancellation signal from the stage input signal provided to the next stage.

41. The receiver circuit of claim 39, each signal regeneration circuit is configured to obtain hard-detected bits for the signal of interest by making hard decisions on the soft values, to generate the cancellation signal from the hard-detected bits, and to subtract the cancellation signal from the stage input signal provided to the next stage.

42. The receiver circuit of claim 41, wherein the receiver circuit is configured to decode the soft values obtained in each stage to obtain decoded bits for all signals of interest independent of the hard-detected bits used in each stage to generate the cancellation signals.

43. The receiver circuit of claim 29, wherein the stage input signals comprise signal samples derived from the received composite signal, and wherein each stage includes a despreading circuit configured to provide the despread values operated on by the RAKE combining circuit by despreading the stage input signal into different streams of despread values that are RAKE combined according to the impairment correlations.

44. The receiver circuit of claim 43, wherein the signal regeneration circuit in each stage that includes a signal regeneration circuit is configured to:
generate a cancellation signal by generating respread values based on the signal of interest detected by the stage; and
subtracting the cancellation signal from the stage input signal provided to the next stage.

45. The receiver circuit of claim 44, wherein each signal generation circuit is configured to generate the respread values based on bits detected from the RAKE combined despread values of the stage input signal.

46. The receiver circuit of claim 44, wherein each signal generation circuit is configured to generate the respread values by re-encoding decoded bits obtained from the RAKE combined despread values of the stage input signal.

47. The receiver circuit of claim 44, wherein each signal regeneration circuit is configured to generate the respread values according to channel estimates corresponding to the signal of interest.

48. The receiver circuit of claim 29, wherein the stage input signals comprise different streams of despread values derived from the received composite signal, and wherein each stage is configured to detect the signal of interest by RAKE combining the different streams of despread values comprising the stage input signal to the stage based on the impairment correlations determined for that stage.

49. The receiver circuit of claim 48, wherein each signal regeneration circuit is configured to generate a cancellation signal as regenerated despread values corresponding to the signal of interest detected by stage in which the signal regeneration circuit is included, and to subtract the cancellation signal from the stage input signal provided to the next stage.

50. The receiver circuit of claim 29, wherein each stage is configured to perform joint detection to detect a signal of interest.

51. The receiver circuit of claim 29, wherein the RAKE combining circuit in each stage includes an impairment correlation estimator that is configured to compute one or more impairment correlation matrices based on the impairment correlations determined for the despread values of the stage input signal for that stage, and wherein the RAKE combining circuit is configured to generate the RAKE combining weights based on the one or more impairment correlation matrices.

52. The receiver circuit of claim 51, wherein the impairment correlation estimator is configured to compute the one or more impairment correlation matrices based on a pilot correlation matrix.

53. The receiver circuit of claim 52, wherein the impairment correlation estimator is configured to compute the one or more impairment correlation matrices by combining the pilot correlation matrix with a code reuse matrix to account for code reuse interference between signals of interest in the received composite signal.

54. The receiver circuit of claim 52, wherein the impairment correlation estimator is configured to compute the one or more impairment correlation matrices by combining the pilot correlation matrix with an interference matrix to account for cancelled interference.

55. The receiver circuit of claim 29, wherein each signal detection stage includes or is associated with an impairment correlation estimator, and wherein the impairment correlation estimator is configured to compute the impairment correlations for the stage based on pilot signals received in association with the signals of interest.

56. The receiver circuit of claim 55, wherein the impairment correlation estimators from the successive stages are configured so that impairment correlations for the first stage are, at least during a first mode of operation, calculated as an impairment correlation matrix based on the pilot signals received in association with the signals of interest, and wherein the impairment correlations for each successive stage are calculated based on deriving an additional impairment correlation matrices for the successive stages based on postulating effects of successive interference cancellation.

57. The receiver circuit of claim 56, wherein the receiver circuit computes a signal quality measurement for each stage based on the impairment correlation matrix calculated for each stage for reporting to a network by a receiver in which the receiver circuit is included.

58. The receiver circuit of claim 57, wherein the first mode of operation comprises an unselected user mode wherein a receiver in which the receiver circuit is included is not selected for active reception of traffic from a supporting network, and wherein a second mode of operation comprises an active mode where the receiver is selected for active reception of traffic.

59. The receiver circuit of claim 58, wherein the receiver circuit is configured such that during the second mode of operation the impairment correlation estimators estimate impairment correlations based on measured impairment correlations associated with the stage input signal provided to each stage.

60. A receiver circuit for detecting more than one signal of interest in a received composite signal, the circuit comprising:
a plurality of successive signal detection stages to successively detect the signals of interest, each said stage configured to detect a particular one of the signals of interest by RAKE combining despread values of a stage input signal according to stage-specific impairment correlations estimated for those despread values; and
wherein each stage except for a last stage includes a signal regneration circuit configured to regenerate a cancellation signal based on the signal of interest detected by the stage and further configured to cancel that signal of interest from the stage input signal provided to the next stage in the succession of signal detection stages.

61. The receiver circuit of claim 60, wherein a signal detection circuit in each stage comprises a RAKE combiner to form a combined signal by combining the despread values of the stage input signal according to combining weights, an impairment correlation estimator to generate impairment correlation estimates for the despread values, a combining weight generator to generate the combining weights based on the impairment correlation estimates, and a demodulator to generate soft values by demodulating the combined signal.

62. The receiver circuit of claim 61, wherein the impairment correlation estimator for each stage generates stage-specific impairment correlation estimates that reflect cancellation of the signals of interest detected by any prior stages.

63. The receiver circuit of claim 61, wherein the signal detection circuit in each stage further comprises a decoder to generate decoded bits from the soft values for output as the signal of interest detected by that stage.

64. The receiver circuit of claim 61, wherein the signal regeneration circuit included in each but the last stage comprises a signal regenerator that is configured to generates a cancellation signal based on regenerating sample values corresponding to the signal of interest detected by that stage, and a summing circuit that is configured to subtract the regenerated sample values from the stage input signal provided to the next stage.

65. The receiver circuit of claim 64, wherein the stage input signals comprise despread values corresponding to samples of the received composite signal, and wherein the sample values output by the signal regeneration circuit comprise despread sample values of the signal of interest detected by that stage that account for computed code cross-correlations arising from despreading the received composite signal.

66. The receiver circuit of claim 64, wherein the stage input signals comprise samples of the received composite signal, and wherein the sample values output by the signal regeneration circuit comprise respread sample values of the signal of interest detected by that stage that account for channel effects determined for the signal of interest.

* * * * *

UNITED STATES PATENT AND TRADEMARK OFFICE
CERTIFICATE OF CORRECTION

PATENT NO. : 7,339,980 B2
APPLICATION NO. : 10/795101
DATED : March 4, 2008
INVENTOR(S) : Grant et al.

It is certified that error appears in the above-identified patent and that said Letters Patent is hereby corrected as shown below:

On the Title Page, item (75), under "Inventors", in Column 1, Lines 4-5, after "Yi-Pin" insert -- Eric --.

On the Title Page, Item (56), under "FOREIGN PATENT DOCUMENTS", in Column 2, below Line 1, insert -- WO   WO 01/01594 A1   01/2001 --.

In Column 12, Line 16, delete "$\{c_{mk}(i)\}_{k=1K}$" and insert -- $\{c_{mk}(i)\}_{k=1}^{K}$ --, therefor.

In Column 16, Line 63, delete "$\{\hat{c}^{mk}(i)\}_{k=1}^{K}$" and insert -- $\{\hat{c}_{mk}(i)\}_{k=1}^{K}$ --, therefor.

In Column 17, Line 45, delete "$\{y_{11}(i),$" and insert -- $\{y_1(i),$ --, therefor.

Signed and Sealed this

Seventh Day of October, 2008

JON W. DUDAS
*Director of the United States Patent and Trademark Office*